US010713859B1

(12) United States Patent
McZeal, Jr.

(10) Patent No.: US 10,713,859 B1
(45) Date of Patent: Jul. 14, 2020

(54) WIRELESS FLIGHT DATA RECORDER WITH SATELLITE NETWORK METHOD FOR REAL TIME REMOTE ACCESS AND BLACK BOX BACKUP

(71) Applicant: Alfred McZeal, Jr., Lafayette, LA (US)

(72) Inventor: Alfred McZeal, Jr., Lafayette, LA (US)

(73) Assignee: WORLD WIDE WALKIE TALKIE (MBT), Houston, TX (US)

( * ) Notice: Subject to any disclaimer, the term of this patent is extended or adjusted under 35 U.S.C. 154(b) by 0 days.

(21) Appl. No.: 14/484,262

(22) Filed: Sep. 12, 2014

(51) Int. Cl.
| G06F 7/00 | (2006.01) |
| G06F 19/00 | (2018.01) |
| G07C 5/00 | (2006.01) |
| B64D 1/12 | (2006.01) |
| B64D 25/20 | (2006.01) |
| B64D 25/18 | (2006.01) |
| G07C 5/08 | (2006.01) |
| G01S 19/42 | (2010.01) |

(Continued)

(52) U.S. Cl.
CPC ............... G07C 5/008 (2013.01); B64D 1/12 (2013.01); B64D 25/18 (2013.01); B64D 25/20 (2013.01); G01S 19/17 (2013.01); G01S 19/42 (2013.01); G07C 5/0858 (2013.01); G07C 5/0866 (2013.01); B64D 2045/0065 (2013.01); B64D 2045/0085 (2013.01)

(58) Field of Classification Search
CPC .. B64D 2045/0065; B64D 25/20; B64D 1/14; B64D 2700/62289; B64D 47/08; G06F 12/1408; G07C 5/008; G07C 5/0858
See application file for complete search history.

(56) References Cited

U.S. PATENT DOCUMENTS

| 2,959,459 A | * | 11/1960 | Ryan | G01P 15/00 |
| | | | | 346/7 |
| 3,680,103 A | * | 7/1972 | Houser | G01S 7/2806 |
| | | | | 342/25 E |

(Continued)

OTHER PUBLICATIONS

Krishna M. Kavi, "Beyond the Black Box" p. 1; Jul. 30, 2010. http://spectrum.ieee.org/aerospace/aviation/beyond-the-black-box.

*Primary Examiner* — Khoi H Tran
*Assistant Examiner* — Jorge O Peche

(57) ABSTRACT

A wireless dual flight data recorder apparatus and wireless network method using satellite communications for providing remote data redundancy, location accuracy, and real-time access to live flight data contained in the black box of an aircraft.
An integrated GPS receiver uses the NAVSTAR GPS Precise Position Service allowing emergency responders immediate access to exact location of the device.
A data collection algorithm streams flight data to a remote data center, performs data compaction for decreasing bandwidth, and data encryption for security prior to transmission to a remote data center.
An ejection sensor system signals a second unit to eject milliseconds before impact reducing shock to the recorder. A flotation system allows the device to float on water, a solar panel extends the life of the batteries, and VoIP video camera recorder allows remote surveillance.
The invention protects critical flight data and passengers ensuring expeditious rescue missions for survivors and investigators.

16 Claims, 19 Drawing Sheets

(51) Int. Cl.
*G01S 19/17* (2010.01)
*B64D 45/00* (2006.01)

(56) References Cited

U.S. PATENT DOCUMENTS

| | | | | |
|---|---|---|---|---|
| 4,313,678 A * | 2/1982 | Colvocoresses | ....... | G01C 11/02 356/2 |
| 4,409,670 A * | 10/1983 | Herndon | ................ | G01D 15/00 360/5 |
| 4,646,244 A * | 2/1987 | Bateman | ................ | G01C 5/005 340/963 |
| 5,023,934 A * | 6/1991 | Wheeless | ........... | H04B 7/18506 340/7.56 |
| 6,067,107 A * | 5/2000 | Travaille | ................ | H04H 20/38 348/E7.061 |
| 6,092,008 A * | 7/2000 | Bateman | ................ | G07C 5/008 244/1 R |
| 6,253,326 B1 * | 6/2001 | Lincke | .................... | H04L 29/06 726/12 |
| 6,385,513 B1 * | 5/2002 | Murray | ............. | H04B 7/18508 340/945 |
| 6,397,259 B1 * | 5/2002 | Lincke | .................... | H04L 29/06 709/236 |
| 6,408,180 B1 * | 6/2002 | McKenna | ................ | H01Q 1/32 455/431 |
| 6,530,082 B1 * | 3/2003 | Del Sesto | .............. | H04H 20/38 348/E7.071 |
| 6,530,084 B1 * | 3/2003 | Del Sesto | .............. | H04N 7/088 348/E5.104 |
| 6,725,461 B1 * | 4/2004 | Dougherty | ............. | H04N 7/088 348/E7.031 |
| 6,788,935 B1 * | 9/2004 | McKenna | .............. | H01Q 1/246 455/431 |
| 6,948,070 B1 * | 9/2005 | Ginter | ..................... | G06F 21/10 348/E5.006 |
| 6,990,319 B2 * | 1/2006 | Wright | ................. | G05D 1/0055 340/3.3 |
| 7,028,327 B1 * | 4/2006 | Dougherty | ......... | H04N 7/17318 348/E7.071 |
| 7,069,451 B1 * | 6/2006 | Ginter | ..................... | G06F 21/10 348/E5.006 |
| 7,069,571 B1 * | 6/2006 | Del Sesto | ................ | H04N 5/44 348/E5.096 |
| 7,133,845 B1 * | 11/2006 | Ginter | ................ | G06F 21/10 705/51 |
| 7,222,155 B1 * | 5/2007 | Gebhardt | ................ | H04N 7/088 709/204 |
| 7,603,408 B1 * | 10/2009 | McGinnis | ............. | H04L 41/028 709/203 |
| 7,634,787 B1 * | 12/2009 | Gebhardt | ............. | H04N 7/165 709/202 |
| 8,489,259 B2 * | 7/2013 | Vinue Santolalla | ... | B64D 45/00 102/339 |
| 8,670,879 B1 * | 3/2014 | Angelucci | .............. | B64D 45/00 244/1 R |
| 8,706,357 B1 * | 4/2014 | van den Heuvel | .... | B64D 45/00 701/14 |
| 8,723,057 B2 * | 5/2014 | Miller | .................. | H05K 5/0213 174/524 |
| 8,766,820 B2 * | 7/2014 | Santiago Fontaina | ...................... | B64D 45/00 340/945 |
| 8,892,451 B2 * | 11/2014 | Everett | .................. | G06Q 40/08 705/4 |
| 9,738,398 B1 * | 8/2017 | Wang | ..................... | B64D 45/00 |
| 2001/0032254 A1 * | 10/2001 | Hawkins | ................ | H04W 4/18 709/219 |
| 2002/0109706 A1 * | 8/2002 | Lincke | .................... | H04L 29/06 715/700 |
| 2003/0149616 A1 * | 8/2003 | Travaille | ................ | G07C 13/00 705/12 |
| 2003/0152145 A1 * | 8/2003 | Kawakita | ................ | H04N 5/77 375/240.12 |
| 2003/0225492 A1 * | 12/2003 | Cope | ........................ | G07C 5/008 701/33.4 |
| 2004/0162067 A1 * | 8/2004 | Stefani | ............... | B64D 45/0015 455/431 |
| 2004/0230352 A1 * | 11/2004 | Monroe | ............. | B64D 45/0015 701/3 |
| 2005/0065682 A1 * | 3/2005 | Kapadia | .................. | G07C 5/008 701/36 |
| 2005/0151025 A1 * | 7/2005 | Mendelson | .......... | G05D 1/0055 244/195 |
| 2007/0112489 A1 * | 5/2007 | Avery | .................... | G07C 5/008 701/29.3 |
| 2007/0112576 A1 * | 5/2007 | Avery | .................... | G06Q 10/10 705/7.39 |
| 2007/0124042 A1 * | 5/2007 | Monroe | ................... | G07C 5/0891 701/33.4 |
| 2007/0150126 A1 * | 6/2007 | Crank | .................. | G08G 5/0013 701/4 |
| 2009/0248986 A1 * | 10/2009 | Citron | ................... | G06F 12/0848 711/129 |
| 2010/0141481 A1 * | 6/2010 | O'Flynn | .............. | G08G 5/0043 340/970 |
| 2014/0013002 A1 * | 1/2014 | Holstein | ............ | H04B 7/18504 709/231 |
| 2014/0142803 A1 * | 5/2014 | Argillier | ................ | B64D 45/00 701/33.4 |
| 2016/0176538 A1 * | 6/2016 | Bekanich | ............... | B64D 45/00 701/14 |
| 2016/0260264 A1 * | 9/2016 | Shih | ........................ | G07C 5/008 |
| 2018/0205658 A1 * | 7/2018 | Sullivan | ................. | H04L 67/12 |
| 2019/0371084 A1 * | 12/2019 | Krupa | ................ | H04L 65/4069 |

* cited by examiner

WIRELESS SATELLITE NETWORK INTERFACE

FIG. 8
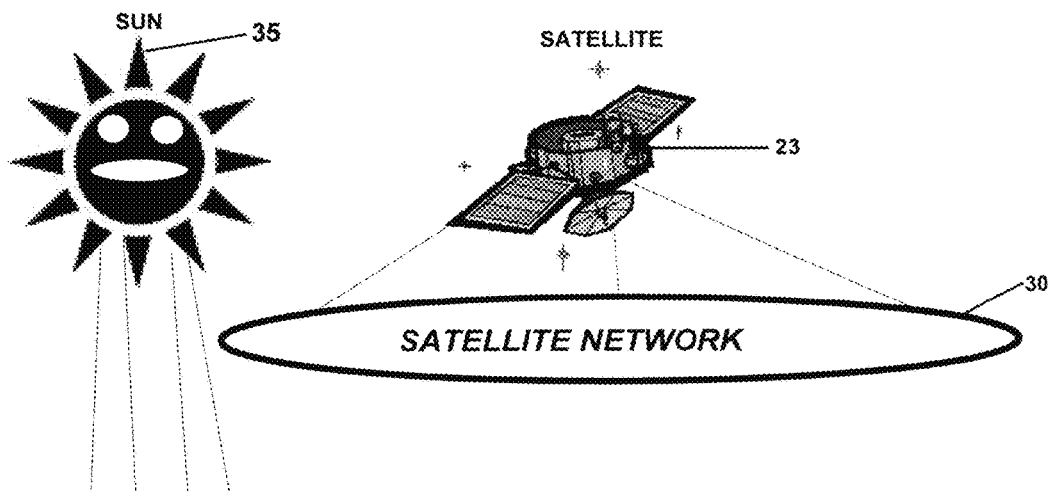
SOLAR POWER SYSTEM
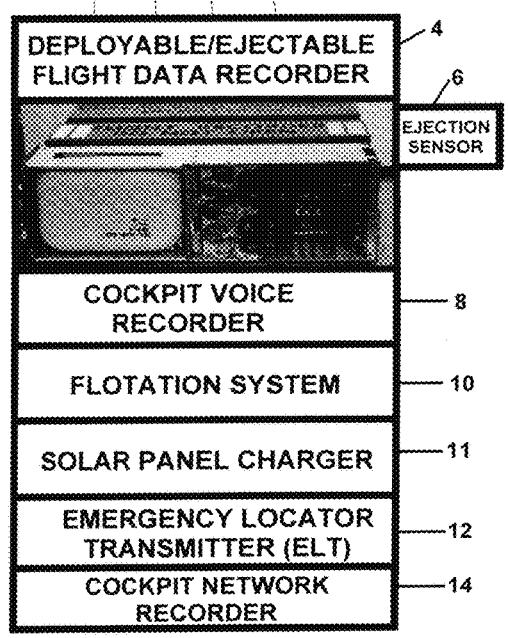
ATLANTIC OCEAN

Remote Video Surveillance Camera Network

REMOTE ACCESS TO CAMERA SYSTEM

AVIATION INVESTIGATOR CHECKING VIDEO STATUS
SURVEILLANCE VIA CELLULAR OR SATELLITE

IP REMOTE DATA CENTER

Voice & Video ACCESS TO CAMERA SYSTEM via VoIP

AVIATION INVESTIGATOR CHECKING VIDEO STATUS
SURVEILLANCE via Voice Over Internet Protocol (VoIP)

NAVSTAR GPS SATELLITE CONSTELLATION - GPS PRECISE POSITION SERVICE

GPS PRECISE POSITION SERVICE REAL TIME PRECISE GPS TRACKING

WIRELESS FLIGHT DATA RECORDER WITH SATELLITE NETWORK METHOD FOR REAL TIME REMOTE ACCESS AND BLACK BOX BACKUP

TABLE OF CONTENTS

TITLE PAGE
FIELD OF THE INVENTION
BACKGROUND OF THE INVENTION I. INTRODUCTION II. THE PROBLEM III A UNIQUE PROBLEM IV. PHYSICAL POSSESSION OF THE BLACK BOX IS REQUIRED V. THE NTSB—INVESTIGATION OF AVIATION ACCIDENTS VI. MALAYSIA AIRLINES FLIGHT 370—CLASSICAL EXAMPLE VII. PARTIAL LIST OF UNRECOVERED RECORDERS VIII. BATTERY LIFE/DEPLOYABLE/SOLAR POWERED IX. DEPLOYABLE FLIGHT RECOVERS (MILITARY VS. CIVIL) X. NTSB PROPOSED REQUIREMENTS XI PROPOSED CHANGES IN THE UNITED STATES—THE SAFE ACT XII COCKPIT/CABIN VIDEO COMMUNICATIONS & VIDEO SURVEILLANCE XIV TYPICAL MODERN DAY FLIGHT DATA RECORDS XIV,. THE FLIGHT DATA ACCESS UNIT (FDAU) XV. REMOTE ACCESS TO QUICK ACCESS RECORDER XVI. COMBINED UNITS XVII THE FUTURE OF BLACK BOX TECHNOLOGY—SATELLITE NETWORKS XVIII PRIOR ART PRIOR RECENT PATENTS XIX. THE BASIC SHORTCOMING OF THE PRESENT SOLUTIONS XX SATELLITE & SATELLITE INTERNET—A PROMISING SOLUTION XXI SPECIFICATIONS USED BY BLACK BOXES XXII—DATA STREAMING OVER SATELLITES XXIII SUBSCRIBER IDENTIFICATION MODULES (SIM) XXIV DATA COMPACTION SPEEDS UP TRANSMISSIONS XXV DATA ENCRYPTION/DECRYPTION ALGORITHMS XXVII REAL TIME STREAMING PROTOCOL XXVIII SATELLITE NETWORK SERVICES IS A VIABLE SOLUTION XXIX GPS SATELLITE & THE PRECISION CODE (P-CODE) XXX The GPS Precise Position Service XXXI GPS SPACE SEGMENT—NAVSTAR SATELLITE CONSTELLATION XXXII VoIP & VIDEO SURVEILLANCE
SUMMARY OF THE INVENTION
OBJECTS AND ADVANTAGES
BRIEF DESCRIPTION OF THE DRAWINGS
DESCRIPTION OF THE PREFERRED EMBODIMENT
CLAIMS
ABSTRACT OF THE DISCLOSURE
DRAWINGS (FIG. 1 THUR FIG. 19)

FIELD OF THE INVENTION

The present invention relates to the design of a wireless flight data recorder system for the aviation safety industry, and, more particularly, to a precision GPS enabled wireless satellite apparatus, and method for providing real time backup of critical flight data contained in the 'black box' for immediate access by emergency responders.

This invention deploys high speed satellite and satellite Internet communications, thus, field of the invention also relates to Telecommunications and wireless communications. The wireless flight data recorder system presented provides data redundancy to remote data locations, real time GPS precise location, and video surveillance consistent with modern day computer technology.

BACKGROUND OF THE INVENTION

I. INTRODUCTION—CRITICAL FLIGHT INFORMATION IS AT RISK OF LOSS

A flight data recorder (FDR) and Cockpit Voice Recorder (CVR) function is to record critical flight data. This FDR is also commonly known as a "black box" in the aviation field. The terms FDR and Black Box are used interchangeable in this patent application to have the same meaning. The flight data recorder is an electronic recording device placed in an aircraft for the purpose of facilitating the investigation of aviation accidents and incidents when they do occur.

This data is at high risk if the aircraft is lost from radar, compromised, or vandalized. Additionally, the aircraft and any potential survivors may also be lost.

The data recorded by a flight data recorder is used for accident investigation, as well as for analyzing air safety issues, material degradation and engine performance. Due to their importance in investigating accidents, these government regulated devices are carefully engineered and stoutly constructed to withstand the force of a high speed impact and the heat of an intense fire. Contrary to the "black box" reference, the exterior of the FDR is coated with heat-resistant bright orange paint for high visibility in wreckage, and the unit is usually mounted in the aircraft's tail section, where it is more likely to survive a severe crash. Following an accident, the recovery of the FDR is usually a high priority for the investigating body, as analysis of the recorded parameters can often detect and identify causes or contributing factors.

To date, these recorders are exclusively contained on board within the aircraft and there is 'no remote access' to this most critical data in the event of destruction, loss, or vandalism of these black boxes. This invention addresses that problem.

II. THE PROBLEM
DISCUSSION:

The data contained in the black box is urgently needed by aviation investigators and authorities in order to understand what happened to a flight when the aircraft crashes to land or sea. This being the case, there must be a mechanism in place to preserve, and access this data on a real-time basis, and also to have copies of this data in the event the aircraft is lost, or even vandalized, or in the event of theft. Thus, the black box data is so important that its data cannot be simply contained within the aircraft, but must be networked in order that this data may be duplicated, and/or accessed in the event of a crash of the aircraft.

III. A UNIQUE PROBLEM

A unique problem with flight data recorders becomes apparent when the entire aircraft is lost on radar or the FDR cannot be located by emergency responders. There are two common types of flight recorders, the flight data recorder (FDR) and the cockpit voice recorder (CVR). In some cases, the two recorders may be combined in a single unit. In this application the two units are combined.

The present technology however does not allow for remote/real-time access to this critical data contained in the device while in flight and thus the data ultimately remains on the aircraft without a backup and this critical data could be lost. Also, if he aircraft is lost, then there is chance the FDR will also be lost, and this is a critical problem that can be easily avoided and resolved with the application and deployment of modern communications and computer technologies. In general these flight recorders are required to be capable of surviving the harsh conditions likely to be encountered in a severe aircraft accident and for this reason, they are typically specified to withstand an impact of 3400 g and temperatures of over 1,000° C. (1,830° F.) as required by EUROCAE ED-112. The basis design of these devices presently depends upon the FDR being located for analysis of an aviation accident. Thus it stands to reason that if the FDR cannot be located, then emergency responders will have lost valuable and critical information as to what actually happened in the event of an aviation accident.. However, with the advent of current satellite communication and broadband technologies, there is no reason that this critical data, or the aircraft, or survivors or even the bodies of dead passengers should be lost.

Surviving victims of an air crash should be immediately located and offered medical attention, and the bodies of dead passengers, if any, should be immediately IV. PHYSICAL POSSESSION IS REQUIRED TO ACCESS THE CRITICAL DATA recovered as quickly as possible and returned to their respective families. This invention will solve that problem by redesigning the current black box technology to include a satellite network for bringing the entire flight online. The term 'black box' will be used throughout this application and refers to the flight data recorders. A down point with black boxes is that physical possession is required to study the data.

The main shortcoming with the present technology is that critical data stored within these black boxes are not immediately available to emergency responders while in flight on a real time basis. For example, emergency response do not have ON DEMAND or remote access or remote control over the critical data stored within these black boxes. The present technology have these black boxes on board the aircraft, but under the present scheme, actual physical possession is required in order to access the data. Without physical possession of these devices, the data is essentially lost, such as in the recent case with Malaysia flight 370. However flight 370 was not the first flight that fell off of radar and where the FDR was lost. There are indeed other cases as explained herein. This presents a real problem because all of the investigative data is lost, leaving investigators at a loss as to what actually caused the problem with the crash. Any helpful information that could have been used to study why the flight crashed is lost forever and the chances of rescuing any survivors is slim to none.

This data is needed immediately because emergency Investigators analyze this data within the black box to understand what caused the crash.

In fact, this information is so critical and so important that this data cannot be lost due to the dire circumstances. described herein Redundancy at a remote V. The NTSB—INVESTIGATION OF AVIATION ACCIDENTS location is needed to protect the data and will allow investigators to act much faster, even before the black box is actually found. As will be seen, virtual physical possession can be accomplished with a streaming link between the system black box data system and remote data locations, that can be physically located anywhere in the world using standard Internet protocol addressing techniques (TCP/IP) and/or basic satellite technology. In the United States for U.S. air carriers and manufacturers, the National Transportation Safety Board (NTSB) is responsible for investigating accidents and safety-related incidents. The NTSB also serves in an advisory role for many international investigations not under its formal jurisdiction. The NTSB does not have regulatory authority, but must depend on legislation and other government agencies to act on its safety recommendations.

VI. Malaysia Airlines Flight 370-A CLASSICAL EXAMPLE

There has over very recent times been many cases where the FDR or black box could not be located. In recent times, Malaysia Airlines Flight 370 is a classical example of the problem. Malaysia Airlines Fight 370 was a scheduled international passenger flight from Kuala Lumpur to Beijing that lost contact with air traffic control on Mar. 8, 2014 at 01:20 MYT (17:20 UTC, 7 March), which was less than an hour after takeoff. At 07:24, Malaysia Airlines (MAS) reported this commercial flight missing. The aircraft, was a Boeing 777-200ER, and was carrying 12 Malaysian crew members and 227 passengers from 14 nations. Despite a multinational search effort which began in the Gulf of Thailand and the South China Sea the aircraft could not be found or located. This also means that the black box or the flight data recorder (or its data) could not be located. The black box data is essentially 'offline'.

VII. PARTIAL LIST OF UNRECOVERED FLIGHT RECORDERS

The disappearance of Malaysia Airlines Flight 370 demonstrates the limits of the contemporary flight recorder technology. Physical possession of the flight recorder device is necessary to help investigate the cause of an aircraft incident.

Considering the advances of modern communication technology commentators called for flight recorders to be supplemented or replaced by a system for "live streaming" data from the aircraft to the ground. This is indeed possible with today state of the art communications technologies, including satellite technologies which can be used to stream this data.

There has been many other instances where the black box was lost. Below is a partial list of flight data recorders which were unrecoverable in the past:

PARTIAL LIST OF RECORDERS NEVER FOUND

| DATE OF CRASH | FLIGHT NO. | AIRLINE | PLANE TYPE | PRESUMED LOCATION | NOTES |
| --- | --- | --- | --- | --- | --- |
| 1965 Aug. 16 | 389 | United Airlines | Boeing 727-22 | Lake Michigan of Chicago, Ill resting in (249 ft) of water | FDR recording media never found.. |
| 1970 May 02 | 980 | ALM Douglas | DC-9-33CF | Caribbean Sea Resting in 5,000ft of water | Neither Recorder was found |
| 1973 Jul. 22 | 816 | Pan America | Boeing 707-321B | Pacific Ocean, off Papeete, Tahiti Resting in 2,300ft of water | Neither Recorder was found |
| 1975 Sep. 30 | 240 | Maley Tupolev | TU-154 | Lebanese shoreline Resting in between 2,000-3,000ft of water | Recorder was never found |
| 1979 Jan. 30 | cargo | Varig Aircraft | PP-VLU BOEING | Pacific Ocean, around 200 kilometers from Tokyo, Japan | Recorder was never found |

-continued

PARTIAL LIST OF RECORDERS NEVER FOUND

| DATE OF CRASH | FLIGHT NO. | AIRLINE | PLANE TYPE | PRESUMED LOCATION | NOTES |
|---|---|---|---|---|---|
| 1987 Nov. 28 | 295 | South Africa Airways | Boeing 747-244B | Combi Indian Ocean, near Mauritius | CVR located at 16,000 ft; FDR Not Found |
| 1987-13-29 | 858 | Korean Air | Boeing 747-3B56 | Andaman Sea | Neither flight recorder was found |
| 1988 Jul. 03 | 655 | Iran Air | Airbus | 300 Persian Gulf | Flight Recorder was Never found |
| 1992 Oct. 04 | 1862 | El Al Israel | Boeing 747-25BF | Groeneveen and Klein-Kruitberg flats in the Bijlmermeer, Amersterdam Sea; | Neither flight recorder was found |
| 2001 Sep. 11 | 11 | American Airlines | Boeing 767-223ER | North World Trade Center, New York | Flight Recorder was never found |
| 2001 Sep. 11 | 175 | United Airlines | Boeing 767-222 | South World Trade Center, New York | Flight Recorder was never found |

In most of the above cases the aircraft debris was never located and thus, neither the CVR and FDR was ever found and the cause of the crash was never determined.

VIII. Battery Life/Deployable Flight Recorders/Solar Panels

Another limitation with the current technology is that batteries within the flight data recorders on an average last only up to 30 days. This presents a real problem if the search for the wreckage takes longer than 30 days such as in the search for Malaysia flight 370. One possible solution is to extend the life of the batteries to a longer period, e.g, 30-120 days, is by adding a solar charging system to the current technology.. After Malaysia 370, some commentators called for the battery life of the underwater locator beacons to be extended from 30 to 90 days, the range of the locator to be increased and additionally for the outfitting of civil aircraft with deployable flight recorders, commonly used in military aircraft Previous to MH370 the extension of the battery life has been suggested as "rapidly as possible" by investigators of the Air France Flight 447 crash. The AF447 crash happened in 2009. It took until 2011 to recover the flight recorders in this case. Intelligent Solar Panels as discussed in this application may be used to extend the life of the batteries. Extending the battery life of these devices increase the chances of a successful rescue mission to recover these black boxes and recovering the aircraft and any possible survivors who may have survived the crash.

IX. DEPLOYABLE FLIGHT RECORDER—MILITARY vs. CIVIL AIR CRAFT

At present Civil Aircraft in general, do not practice deployable flight recorders which are commonly used in military aircraft. A duplicate or deployable flight recorder can also be installed with Civil and Commercial Air Craft as redundancy, and for increased chances of locating the devices in a timely manner.

These same methods used by the military may also be used in a Civilian aircraft or commercial airline to enhance the chances of recovering the physical black box.

X. NTSB PROPOSED REQUIREMENTS

One of the objectives of this invention is to incorporate important proposed requirement by the NTSB, and other agencies enabling a more robust and intelligent design. The NTSB recommended in 1999 that operators be required to install two sets of CVDR systems, with the second CVDR set being "deployable or ejectable". The "deployable" recorder combines the cockpit voice/flight data recorders and an emergency locator transmitter (ELT) in a single unit. The "deployable" unit would depart the aircraft milliseconds before impact, activated by sensors. The unit is designed to "eject" and "fly" away from the crash site, to survive the terminal velocity of fall, to float on water indefinitely, and would be equipped with satellite technology. for immediate location of crash impact site. The "deployable" CVDR technology has been used by the U.S. Navy since 1993. The recommendations would involve a massive retrofit program.

Government funding would negate cost objections from manufacturers and airlines. Operators would get both sets of recorders for free: they would not have to pay for the one set they are currently required by law to carry. The cost of the second "deployable/erectable CVDR" (or "Black Box") was estimated at $30 million for installation in 500 new aircraft (about $60,000 per new commercial plane.)

XI. PROPOSED CHANGES IN THE UNITED STATES

In the United States, the proposed SAFE Act calls for implementing the NTSB 1999 recommendations. The SAFE ACT legislation failed to pass Congress in 2003 (H.R. 2632), in 2005 (H.R. 3336) and in 2007 (H.R. 4336). Originally the "Safe Aviation Flight Enhancement (SAFE) Act of 2003" was introduced on Jun. 26, 2003 by Congressman David Price (NC) and Congressman John Duncan (Tennessee) in a bipartisan effort to ensure investigators have access to information immediately following commercial accidents. On Jul. 19, 2005, a revised SAFE Act was introduced and referred to the Committee on Transportation and Infrastructure of the U.S. House of Representatives. The bill was referred to the House Subcommittee on Aviation during the 108th, 109th, and 110th congresses.

XII. COCKPIT/CABIN VIDEO COMMUNICATIONS & VIDEO SURVEILLANCE

At present there is no video communications on FDR system or aboard flights. Video surveillance is used extensively around the world to track activity in commercial institutions, personal home estates, and any area that needs surveillance. As will be demonstrated in this patent application, it is possible to install video recorders on the flight to monitor not only the cockpit communications but also activity in the passenger cabin where travelers are located during the duration of the flight. With IP addressing, Video and Audio can be included in the flight data recorder so that investigators get a view of the cockpit and cabin which can be added as part of the FDR system data. Additionally, an online video camera system can be accessed remotely by investigators to check the status of the flight and actually see the actual activity which is occurring on the flight. This is useful in the event investigators have an emergency on a flight. These cameras can be accessed remotely in order to allow authorities to check the status of the cockpit and cabin before entering the aircraft in the event of any emergency, such as a terrorist threat.

XIII. A TYPICAL MODERN DAY FLIGHT RECORDER SYSTEM

A modern day Cockpit voice recorder and flight data recorder, encompasses each with a USB on the front. A flight data recorder FDR (also ADR, for accident data recorder) is generally known as an electronic device employed to record any instructions sent to any electronic systems on an aircraft. (This could be video too.)

The device is used to record specific aircraft performance parameters. Another kind of flight recorder is the cockpit voice recorder (CVR), which records conversation in the cockpit, radio communications between the cockpit crew and others (including conversation with air traffic control personnel), as well as ambient sounds. At present flight recorders do not record or capture video data.

In this design both functions have been combined into a single unit. The current applicable FAA TSO is C124b titled Flight Data Recorder Systems. These solutions can be modified to included communications technologies which will allow the devices to communicate with satellites to form a wireless network for surveillance, tracking purposes, and data redundancy for the preservation of critical flight data.

XIV. THE FLIGHT DATA ACQUISITION UNITS (FDAU)

Modern day FDRs receive inputs via specific data frames from the Flight Data Acquisition Units (FDAU). They record significant flight parameters, including the control and actuator positions, engine information and time of day. There are 88 parameters required as a minimum under current U.S. federal regulations, but some systems monitor many more variables. Generally each parameter is recorded a few times per second, though some units store "bursts" of data at a much higher frequency if the data begins to change quickly. Most FDRs record approximately 17-25 hours worth of data in a continuous loop. It is required by regulations that an FDR verification check (readout) is performed annually in order to verify that all mandatory parameters are recorded. The "continuous loop" requirement may be expressed as a software algorithm that can be deployed in the system which infinitely records the data or until the end of flight. With the new design, the Flight data acquisition units can be connected via satellite communications link and the location of the Flight is known immediately. As set forth in this application, the continuous connection to a communications satellite system, a real time remote connection can be realized and the FDR data can in fact be copied or transmitted to a remote location for backup purposes.

However as previously stated, even the most advance FDR system does not provide for a remote connection. This has also given rise to flight data monitoring programs, whereby flights are analyzed for optimum fuel consumption and dangerous flight crew habits. The data from the FDR is transferred, in situ, to a solid state recording device and then periodically analyzed with some of the same technology used for accident investigations. In other cases the data is downloaded from the aircraft's Quick Access Recorder (QAR), either by transfer to a portable solid state recording device or by direct upload to the operator's headquarters via radio or satellite. FDRs or black boxes as they are commonly called are usually located in the rear of the aircraft, typically in the tail. In this position, the entire front of the aircraft is expected to act as a "crush zone" to reduce the shock that reaches the recorder. Also, modern FDRs are typically double wrapped in strong corrosion-resistant stainless steel or titanium, with high-temperature insulation inside. They are usually bright orange. They are designed to emit an ultrasonic "ping" from an underwater locator beacon for up to 30 days and can operate immersed to a depth of up to 20,000 feet.

XV. REMOTE ACCESS TO THE QUICK ACCESS RECORDER

Ever since the 1970s, most large civil jet transports have been additionally equipped with a "quick access recorder" (QAR). This device records data on a removable storage medium. Access to the FDR and CVR is necessarily difficult because of the requirement that they survive an accident.

They also require specialized equipment to read the recording. However the QAR recording medium is readily removable and is designed to be read by equipment attached to a standard desktop computer. In many airlines, the quick access recordings are scanned for 'events', an event being a significant deviation from normal operational parameters. This allows operational problems to be detected and eliminated before an accident or incident results.

Many modern aircraft systems are digital or digitally controlled. Very often, the digital system will include Built-In Test Equipment which records information about the operation of the system.

This information may also be accessed remotely to assist with the investigation of an accident or incident. As will be seen, remote satellite/cellular access to this device can resolve the problem of data loss considering the advance communications methods which are now available for the efficient transmission of this important black box data to other remote locations for backup.

XVI. COMBINED UNITS:

With the advent of digital recorders, the FDR and CVR can be manufactured in one fireproof, shock proof, and waterproof container as a combined digital Cockpit Voice and Data Recorder (CVDR). Currently the CVDR is manufactured by L-3 Communications as well as other manufacturers. These units can be placed on a wireless communications network such as a satellite network described herein, in order to extract and transmit the flight data to remote locations for data redundancy.

XVII. THE FUTURE OF BLACK BOX TECHNOLOGY—SATELLITE NETWORKS

Given today's high speed communications capabilities, including high bandwidth applications, the ability to compact data, the future of black box communications lies in the ability to connect to the flight data in realtime, and to have a backup copy of this important data readily, and immediately available for investigators.

Data streaming and remote data storage is a way of life now, and has much merits in FDR applications because this critical data can be streamed to other remote locations. Satellite technology, including GPS precision satellite technology, combined with Internet and computer technology is the only real solution for gaining immediate location, and real time access to the data contained in the black box. Video capture and video surveillance as presented in this invention will provide real time access to the FDR and video camera system allowing investigators to discover the status and precise location of the recorders at anytime, even before a crash.

The ability to implement redundancy of the data makes this invention a very viable solution because the data is now "online" and can be readily accessed in emergency situations and to perform an investigation or to understand what caused a aircraft to crash even long before the actual physical recorders are found. The invention specification is also consistent with NTSB proposed requirements.

XVIII. PRIOR ART—PRIOR AND RECENT PATENTS

A "Coding Apparatus For Flight Recorders And The Like" was invented and patented in the United States by James J. "Crash" Ryan, a professor of mechanical engineering at the University of Minnesota from 1931 to 1963; U.S. Pat. No. 2,959,459 was filed in August 1953 and approved on Nov. 8, 1960. Ryan, the inventor of the retractable seat belt now required in automobiles, began working on the idea of a flight recorder in 1946, and invented the device in response to the 1948 request from the Civil Aeronautics Board for development of a flight recorder as a means of accumulating data that could be used to get information useful in arriving at operating procedures designed to reduce air mishaps. The original device was known as the "General Mills flight recorder". This invention was one of the earliest forms of the art.

A "Cockpit Sound Recorder" (CSR) was independently invented and patented by Edmund A. Boniface, Jr., an aeronautical engineer of Lockheed Aircraft Corporation and originally filed with the U.S. Patent Office U.S. Pat. No. 3,327,067; on Feb. 2, 1961 as an "Aircraft Cockpit Sound Recorder"; the 1961 invention was viewed by some as an "invasion of privacy". Subsequently Boniface filed again on Feb. 4, 1963 for a "Cockpit Sound Recorder" with the addition of a spring loaded switch which allowed the pilot to erase the audio/sound tape recording at the conclusion of a safe flight and landing.

Boniface's participation in aircraft crash investigations in the 1940s and in the accident investigation of the loss of one of the wings at cruise altitude on each of two Lockheed Electra turboprop powered aircraft (Flight #542 operated by Braniff Airlines in 1959 and Flight #710 operated by Northwest Orient Airlines in 1960) that led to his wondering what the pilots may have said just prior to the wing loss and during the descent as well as the type and nature of any sounds or explosions that may have preceded or occurred during the wing loss. His patent was for a device for recording audio of pilot remarks and engine or other sounds to be "contained with the in-flight recorder within a sealed container that is shock mounted, fireproofed and made watertight" and "sealed in such a manner as to be capable of withstanding extreme temperatures during a crash fire". The CSR was an analog device which provided a progressive erasing/recording loop (lasting 30 or more minutes) of all sounds (explosion, voice, and the noise of any aircraft structural components undergoing serious fracture and breakage) which could be overheard in the cockpit.

U.S. Pat. No. 8,766,820 by Santiago Fontaina Jul. 1, 2014 is a device for locating crashed aircraft. invention which consists of a device especially configured for enabling locating an aircraft quickly which due to an accident has fallen in an area where the search for the remains is especially difficult, such as the sea or mountainous areas.

The invention here is made up of a container, with an automated lock which is divided internally into two chambers (2 and 3) in which metal sheets and hollow spheres are introduced; an attached beacon, a memory circuit; and it is operated by means of an automated control.

U.S. Pat. No. 8,723,057 Miller et al May 13, 2014 is a Systems and methods for protecting a flight recorder.

In this embodiment, a crash survivable memory unit, comprises a memory device that records flight data; a flexible insulation layer that inhibits thermal energy from conducting from an external side of the flexible insulation layer to an internal side of the flexible insulation layer, wherein the internal side faces the memory device; a micro lattice layer abutting the internal side and enclosing the memory device, the micro lattice layer configured to distribute thermal energy that passes through the flexible insulation layer substantially throughout the micro lattice layer; and a heat absorbing material that impregnates the micro lattice layer, the heat absorbing material configured to absorb the thermal energy in the micro lattice layer; and an impact resistant layer encircling the flexible insulation layer, wherein the impact resistant layer absorbs shocks that result from other objects contacting the impact resistant layer.

U.S. Pat. No. 8,706,357, by inventor van den Heuvel, et al. Apr. 22, 2014 is a Flight recorder deployment system and method. As with the present invention, this invention provides an automatic deployable flight recorder (ADFR) system that includes a deployable fight recorder, a plurality of crash sensors, and a recorder release unit.

The recorder release unit is communicatively coupled to the deployable fight recorder and the plurality of crash sensors, and is configured to initiate deployment of the deployable flight data recorder from an aircraft when a deployment criteria that is adjusted based on a flight condition of the aircraft is satisfied.

U.S. Pat. No. 8,670,879 by Angelucci Mar. 11, 2014, Automatically ejecting flight data recorder is an apparatus for holding a flight data recorder in an aircraft includes a housing that defines a compartment enclosing the flight data recorder and a flotation device encapsulating the flight data recorder. If the aircraft crashes into a body of water and become submerged, one or more releasable fasteners holding the compartment's cover in place are triggered thereby removing the cover over an opening in the compartment and ejecting the flotation device and the flight data recorder out of the compartment. The floatation device then floats the flight data recorder to the surface of the water where it can be located by the rescuers.

U.S. Pat. No. 8,489,259 by Vinue Santolalla et al. Jul. 16, 2013, Aircraft black box Commercial aircraft having a black box comprising a flight data recorder connected to suitable acquisition units for recording information required for crash investigation purposes inside a container, wherein the aircraft comprises a crash detection device ; the black box is installed in a suitable location for being ejected outside the aircraft in a crash event through a duct having its exit in a fuselage area where the ejected black box would not impact on the aircraft; the aircraft also comprises ejection means controlled by a black box ejection control unit connected to said crash detection device, for ejecting the black box through said duct when an impending crash is detected by said crash detection device.

Finally a non patent literature article entitled "BEYOND THE BLACK BOX" by KRISHNA M. KAVI, published Jul. 30, 2010 by the IEEE spectrum addresses similar satellite communications concepts discussed in this application. The article begins "Instead of storing flight data on board, aircraft could easily send the information in real time to the ground". The article support the ideas and concepts of this present invention and also acknowledges the most basic problem discussed in this application. The article is located at: http://spectrum.ieee.org/aerospace/aviation/beyond-the-black-box

XIX. THE BASIC SHORTCOMING OF THE PRESENT SOLUTIONS

The most basic shortcoming of the present FDR systems is that the flight data within the system is 'disconnected" and not immediately accessible to emergency responders in the event of a crash where the aircraft has lost contact with radar systems. Moreover, the data is at risk of loss if the flight goes off of radar.

All of the previously cited black box inventions, including those which predate the year 2014 have one thing in common: they are all disconnected from a data network and none of these invention actually deploy satellite technology for the realization of a "sky network" for manipulating the data in the event the aircraft is lost from radar.

XX. SATELLITE & SATELLITE INTERNET ACCESS—A PROMISING SOLUTION

Satellites offer a global footprint for communications purposes. Even when an aircraft fly off radar, it is still within the footprint of the satellite and can be located.

Satellite Internet access is Internet access provided through communications satellites. Modern satellite Internet service is typically provided to users through geostationary satellites that can offer high data speeds, with newer satellites achieving downstream data speeds up to 15 Mbps. Satellite Internet access can be provided in a variety of ways and efficient access to black box data via satellite could easily provide the medium to transfer data to and from the FDR, the satellite, and remote locations. Data in this respects means all types of data, including live video data, saved to the FDR device, including any video feeds connected via the local area network. Satellite technology can be used as a high speed wireless transport system, to provide the necessary data transfers to duplicate the data, and real time access. Commercial flights are an excellent opportunity for the deployment of Low Earth Orbiting (LEO) satellites., Middle Earth Orbit (MEO) satellites, GEO stationary, and Ultralight atmospheric aircraft as satellites for connecting to black box data.

XXI. SPECIFICATIONS USED BY BLACK BOXES

The design of today's FDR equipment is governed by the internationally recognized standards and recommended practices relating to flight recorders which are contained in ICAO Annex 6 which makes reference to industry crashworthiness and fire protection specifications such as those to be found in the European Organization for Civil Aviation Equipment documents EUROCAE ED55, ED56 fiken A and ED112 (Minimum Operational Performance Specification for Crash Protected Airborne Recorder Systems).

In the United States, the Federal Aviation Administration (FAA) regulates all aspects of U.S. aviation, and cites design requirements in their Technical Standard Order, based on the EUROCAE documents (as do the aviation authorities of many other countries. Thus these specifications must be considered for the design of all new black boxes.)

XXII. DATA STREAMING OVER SATELLITES—A PROPOSED DESIGN

Data streaming in general refers to the transfer of data at a steady high-speed rate sufficient to support such applications as high-definition television (HDTV) or the continuous backup copying to a storage medium of the data flow within a computer.

Data streaming requires some combination of bandwidth sufficiency and, for real-time human perception of the data, the ability to make sure that enough data is being continuously received without any noticeable time lag.

Data streaming and other data transfers to and from the satellite can be streamlined and optimized by reducing or compacting the data files, or data set prior to transmission to remote locations. Data streaming coupled with data compaction provides for very effective transmission and at minimal cost of bandwidth and resources.

XXIII. SUBSCRIBER IDENTITY MODULE (SIM)

This invention also implements wireless data communications from cellular phone towers for connecting to the remote data center wherein these cellular towers utilize high speed internet broad connections such as a 4G connection, or even a wi-fi,or wi-max connection.

In consideration of this design the remote wireless black box design must be have a provision to connect to a cellular network when the flight is in range of a cellular network.

The best and cheapest way to do is with subscriber identity module (SIM) card. A subscriber identity module or subscriber identification module (SIM) is an integrated circuit that securely stores the international mobile subscriber identity (IMSI) and the related key used to identify and authenticate subscribers on mobile telephony devices (such as mobile phones and computers).

This same circuitry can be built in the quick access recorder or other equipment to be transmitted over the wireless network to remote locations for redundancy and flight data backup.

As with modern day communications, it is possible to use the SIM card to connect to wireless internet services, such as 3G, 4G, and several other technologies.

The GSM network is a common network known all over the world, and thus this network could also be used to connect flight data recorder systems to remote data ground locations in order to provide redundancy to the flight data.

XXIV. DATA COMPACTION ALGORITHMS SPEEDS UP TRANSMISSIONS

In telecommunication, and computer science, data compaction is the reduction of the number of data elements, bandwidth, cost, and time for the generation, transmission, and storage of data without loss of information by eliminating unnecessary redundancy, removing irrelevancy, or using special coding.

Some examples of data compaction methods are the use of fixed-tolerance bands, variable-tolerance bands, slope-keypoints, sample changes, curve patterns, curve fitting, variable-precision coding, frequency analysis, and probability analysis.

Simply squeezing noncompacted data into a smaller space, for example by increasing packing density or by transferring data on punched cards onto magnetic tape, is not data compaction. Whereas data compaction reduces the amount of data used to represent a given amount of information, data compression does not. Data Compaction is an important element in developing an effective strategy for remote data transfer especially with large amounts of data which can be contained in FDR devices.

Data Compaction offers faster transfers of data since the basic algorithm will compact or reduce the data, such as in a present day "zip file" and allowing for faster and more efficient transfer of data.

XXV. DATA ENCRYPTION/DECRYPTION ALGORITHMS

Data encryption generally refers to the encryption of data for security purposes for authorized personnel only. If critical flight data were to be transferred over a telecommunications communications link for backup purposes, then that data would need to be first encrypted before sent out over the data communications link in order to protect the confidentiality of the flight data in progress. In this patent application, the data collection embedded is a software system which provides this function.

XXVI. REAL TIME STREAMING SOLUTION—RTSP PROTOCOL

The current advancements of computer and communications technology, affords a real time connection to the critical flight data within the black box which may be established and subsequently routed to remote locations so that the data is preserved, backup, and/or remotely accessible in real time. Streaming this data from the QUICK ACCESS RECORDER (QAR), Acquisition Data Unit, or from remote locations would be desirable in order to preserve this most important flight data.

This application will provide such a method for the preservation and real time access to this most important data. Not having access to the this critical data is the most basic shortcoming of the present day flight data recorder systems.

XVII. REAL TIME STREAMING PROTOCOL

The RTSP protocol or a DATA COLLECTION ROUTINE and other proprietary protocols and software systems can be used to stream data from the FDR, to remote locations anywhere in the world for immediate access by emergency responders.

The Real Time Streaming Protocol (RTSP) is a network control protocol designed for use in entertainment and communications systems to control streaming media servers. The protocol is used for establishing and controlling media sessions between end points. Clients of media servers issue VCR-style commands, such as play and pause, to facilitate real-time control of playback of media files from the server. The transmission of streaming data itself is not a task of the RTSP protocol. Most RTSP servers use the Real-time Transport Protocol (RTP) in conjunction with Real-time Control Protocol (RTCP) for media stream delivery, however some vendors implement proprietary transport protocols. The RTSP server software from RealNetworks, for example, also used RealNetworks' proprietary Real Data Transport (RDT)

XXVIII. SATELLITE NETWORK SERVICES IS A VIABLE SOLUTION

As will be seen the shortcoming of the present technology can be easily overcome by wireless remote satellite connectivity, precision GPS calculations real times access to the flight data controllers, increasing power consumption capabilities and other methods recommended by National and International emergency responders and authorities.

The short comings of the present technology can be easily resolved simply by connecting these 'disconnected black boxes' to a communications and data back up network which will provide the redundancy needed to easily access this most important and critical data. This data can also be saved for future surveillance purposes.

A satellite solution is presently the most viable solution for several reasons and the following are only a few good considerations:

1. Satellites networks and GPS have a global foot print and can provide the exact location of the flight data recorders in the event of a crash, even without radar.
2. Satellites networks offer the ability to form a data communications network for the purposes of storing backup data in remote locations.
3. Satellites networks offer the ability to do real time communications and would allow the black box to stay online much in the same way as any network computer.
4. Satellite networking offer the intrinsic capability of remote access allowing first emergency responders the ability to communicate with the black box or other devices connected to the black box system, such as the video camera communications system.
5. GPS satellites offer military precision using the p-code which provides exact location.

These are only a few of the major advantages of using satellite technology in order to implement a new black box system, but there are yet many more advantages which is self-evident with this invention.

XXIX—GPS SATELLITES & THE PRECISION CODE (P-CODE)

Discussion:

As stated, the main problem with the loss of the flight data recorders when lost from radar lies in fact that the present day flight recorder precise location is not known. If its precise location was known, then emergency responders could determine the exact location of the device by its precise GPS coordinates.

Thus it follows that implementing a precise GPS receiver as part of the technology update would indeed be beneficial in terms of locating the physical black box from this receiver, and this information could be automatically or subsequently transmitted to first responders, or provided on demand upon an inquiry to the wireless invention.

Global Positioning System (GPS) satellites broadcast microwave signals to enable GPS receivers on or near the Earth's surface to determine location and synchronized time. The GPS system itself is operated by the U.S. Department of Defense (DoD) for use by both the military and the general public.

This invention focus mainly on military GPS which uses precision code or the p-code. GPS signals include ranging signals, used to measure the distance to the satellite, and navigation messages. The navigation messages include ephemeris data, used to calculate the position of each satellite in orbit, and information about the time and status of the entire satellite constellation, called the almanac.

The p-code is generally used in military applications along for computing the precise location of particular entity or object or place on earth.

Using precision accuracy within the black box would afford investigators the capability of knowing the precise location of the black box, and thus the location of the aircraft.

XXX. The GPS Precise Positioning Satellite Service— NAVSTAR

The Navstar Global Positioning System (GPS) is a space-based radio navigation system owned and operated by the United States. GPS has provided positioning, navigation, and timing services to military and civilian users on a continuous worldwide basis since first launch in 1978. An unlimited number of users with a civil or military GPS receiver can determine accurate time and location, in any weather, day or night, anywhere in the world.

The wireless apparatus discussed herein may also utilize this technology

The United States Air Force, as the Executive Agent for GPS, is responsible for the design, development, procurement, operation, sustainment, and modernization of the system. The Commander of United States Strategic Command (USSTRATCOM) exercises Combatant Command of GPS through the 14th Air Force (14 AF). 14 AF has day-to-day operational responsibilities for GPS, while its subordinate units, 50th Space Wing (50 SW) and the 2nd Space Operations Squadron (2 SOPS) maintain the health and status of the operational constellation at facilities located at Schriever Air Force Base, Colo. The system is acquired and maintained by the Global Positioning Systems Wing (GPSW) at Space and Missile Systems Center, Los Angeles Air Force Base, Calif.

The Course-Acquisition (C/A) code, sometimes called the Standard Positioning Service (SPS), is a pseudo random noise code that is modulated onto the L1 carrier. Because initial point positioning tests using the C/A code resulted in better than expected positions, the DoD directed "Selective Availability" (SA) in order to deny full system accuracy to unauthorized users. SA is the intentional corruption of the GPS satellite clocks and the Broadcast Ephemerides. Errors are introduced into the fundamental frequency of the GPS clocks. This clock "dithering" affects the satellite clock corrections, as well as the pseudo range observables. Errors are introduced into the Broadcast Ephemerides by truncating the orbital information in the navigation message.

XXXI. GPS Space Segment—NAVSTAR SATELLITE CONSTELLATION

The baseline Navstar satellite constellation nominally consists of 24, properly geometrically spaced operational satellites (Block II, IIA, IIR, and IIR-M), It is precisely this system that can be used to locate the wireless apparatus black box,.

Each satellite broadcasts three pseudo random noise (PRN) ranging codes: the precision (P) code, which is the principal NAV ranging code; the Y-code, used in place of the P-code whenever the anti-spoofing mode of operation is activated; and the coarse/acquisition (C/A) code which is used for acquisition of the P (or Y) code (denoted as P(Y)) and as a civil ranging signal. A navigation (NAV) message based upon data periodically uploaded from the Control Segment is provided by adding the NAV message data to both the 1.023 MHz C/A-code sequence and the 10.23 MHz P(Y)-code sequence. The satellite modulates the two resulting code-plus-data sequences onto a 1575.42 MHz L-band carrier (L1), and modulates just the 10.23 MHz code-plus-data sequence onto a 1227.6 MHz L-band carrier (L2); and then both modulated carriers are broadcast to the user community.

The two broadcast carrier signals are referred to in this application as the PPS SIS. A subset of the PPS SIS, referred to in this document as the SPS SIS, comprises only the 1.023 MHz code-plus-data sequence on the 1575.42 MHz L-band carrier (L1). Collectively, the PPS SIS and the SPS SIS are known as the satellite's navigation signals (or navigation SIS).

These signals can be part of the black box's data collection and may also be used to locate both wireless devices via a direct link to the satellite since there exist a remote connection between the satellite and the actual physical black box. Thus the precise location of the physical black boxes may now be immediately discovered upon demand.

XXXII. VoIP AND VIDEO SURVEILLANCE

VoIP is short for Voice over Internet Protocol. Voice over Internet Protocol is a category of hardware and software that enables people and companies to use the Internet as the transmission medium for telephone calls by sending voice data in packets using IP rather than by traditional circuit transmissions of the Public Switch Telephone Network (PSTN)

The Session Initiation Protocol (SIP) is a signaling communications protocol, widely used for controlling multimedia communication sessions such as voice and video calls over Internet Protocol (IP) networks. The protocol defines the messages that are sent between endpoints, (such as cameras, soft phones, ip phones, etc) which govern establishment, termination and other essential elements of a call. SIP can be used for creating, modifying and terminating sessions consisting of one or several media streams. SIP can be used for two-party (unicast) or multiparty (multicast) sessions. Other SIP applications include video conferencing, streaming multimedia distribution, instant messaging, presence information, file transfer, fax over IP and online games.

VoIP is an excellent technology for connecting to the camera surveillance system proposed in this invention. In simple terms, endpoints can be established such that investigators and other authorities can review security camera on board the flight, and even establish two way communications between the cameras and a remote source connected to the VoIP network.

Although VoIP is not a necessary element in establishing communications to remote camera system in this invention, it is discussed because VoIP would in fact be a viable solution to accessing the on board video system discussed in this invention if satellite internet services are implemented in the solution. This would make it possible for investigators to not only view the cockpit and passenger cabin of the aircraft, but it would be possible to actually communicate with a live person near those cameras in the event of an emergency.

SUMMARY OF THE INVENTION

In accordance with the present invention, there is provided. a wireless flight data recorder apparatus and interstellar network method using satellite communications technology for providing remote data redundancy, storage, and real-time wireless access to critical flight data contained in the apparatus including voice, and video communications from the cockpit and passenger cabin of the aircraft, allowing status conditions of the aircraft to be immediately known and available to aviation investigators during the duration of the flight or in the event of a crash. An ejection sensor system or plurality of ejection sensors allows the deployable floatable solar powered unit to eject from the aircraft milliseconds before a crash making it easy for investigators to locate the physical black box and reducing the shock that could possible reach the flight data recorder upon crash impact.

A Data Collection algorithm compacts and encrypts the flight data prior to being transmitted via satellite to a remote data center for backup, allowing for robust transmission of data to a remote data center for backup that can be located anywhere in the world.

A flotation system encapsulated around the device allows the recorder to float to the surface in the event the aircraft crashes in water. A solar charging system built in to the design extends the battery life of device allowing beacon distress signals to continue broadcasting in the event the recovery mission is longer than the normal thirty days.

The invention provides remote backup and real time access to the black box data and video surveillance for the duration of the entire fight and the black box data is now "online".

Emergency responders can immediately access the apparatus and its critical data in realtime and gain access to a full copy of a remote "virtual black box", and status of the aircraft even before locating the actual physical units in the event of a crash.

The invention solves the problem of air crafts being lost on radar, lost black boxes and guarantees that the black box data is made available to first responders as soon as possible for a successful rescue mission of the box and any possible crash survivors.

OBJECTIVES AND ADVANTAGES

It would be advantageous to provide a remote high speed FDR system for immediate access to the critical data contained in Flight Data Systems.

It would be advantageous to provide redundancy of the flight data recorder such that this same data may be available in real time, and saved to a remote location for later access.

It would also be advantageous to provide a method of security, and secure transfer of critical flight data to multiple remote locations for backup purposes, and for immediate access to emergency responders.

It would be advantageous to provide a mechanism and procedure for keeping the black box 'online" to a wireless network in the event the aircraft goes off of radar.

It would be advantageous to provide a mechanism and process which can preserve online flight data and prevent damaged to the black box which can be caused by crash impact, fires or pressure.

I would be advantageous to provide the flight data and video online immediately to emergency responders via online communications link and global network to assist in locating survivors within the first 24 hours.

It would be advantageous to provide a system which support currently suggested technology updates by the NTSB and other international investigative agencies.

It would be advantageous to provide a FDR system which can be remotely accessed to prevent to loss or theft of critical black box data.

It would further be advantageous to provide a FDR system that automatically ejects milliseconds prior to impact to reduce the shock that could possible reach the recorders due to a crash.

OBJECTIVES AND ADVANTAGES

It would also be advantageous to provide a FDR system that would comply or be consistent with special government specifications for greater safety in the field of aviation as it relates to FDR systems.

It would be advantageous to provide a GPS enabled black box system which uses precision location to immediately locate the black box. system.

It would be advantageous to provide a solar charging system and methods to extend the life of the batteries in FDR system in the event extra time is needed to locate the device by emergency responders.

It would be advantageous to provide a FDR system which is easy and cost effective to update according to government specifications.

It would be advantageous to provide a universal satellite interface device that would allow communications of data between the FDRsystem and remote data centers.

It would be advantageous to provide an ejectable floatable device which save emergency responders substantial time and resources in locating the device.

It would be advantageous to provide a FDR system which can be located immediately by remote inquiry or by automated broadcast.

It would be advantageous to provide a FDR and Video Capture/Streaming system of capturing video into black boxes and for providing real-time video access to the cockpit recorder and the passenger cabin for real time surveillance purposes.

It would be advantageous for Emergency Responders or security personnel to see and experience a real-time visual of the aircraft in the event of emergencies or the event of criminal activity on the flight.

BRIEF DESCRIPTION OF THE DRAWINGS

A complete understanding of the present invention may be obtained by reference to the accompanying drawings, when considered in conjunction with the subsequent, detailed description, in which:

FIG. 8 is a conceptual view of a solar power system used to increase the extend the batteries of the apparatus allowing the device to stay online for immediate location by first emergency responders;

For purposes of clarity and brevity, like elements and components will bear the same designations and numbering throughout the Figures.

DESCRIPTION OF THE PREFERRED EMBODIMENT

Figure 1:
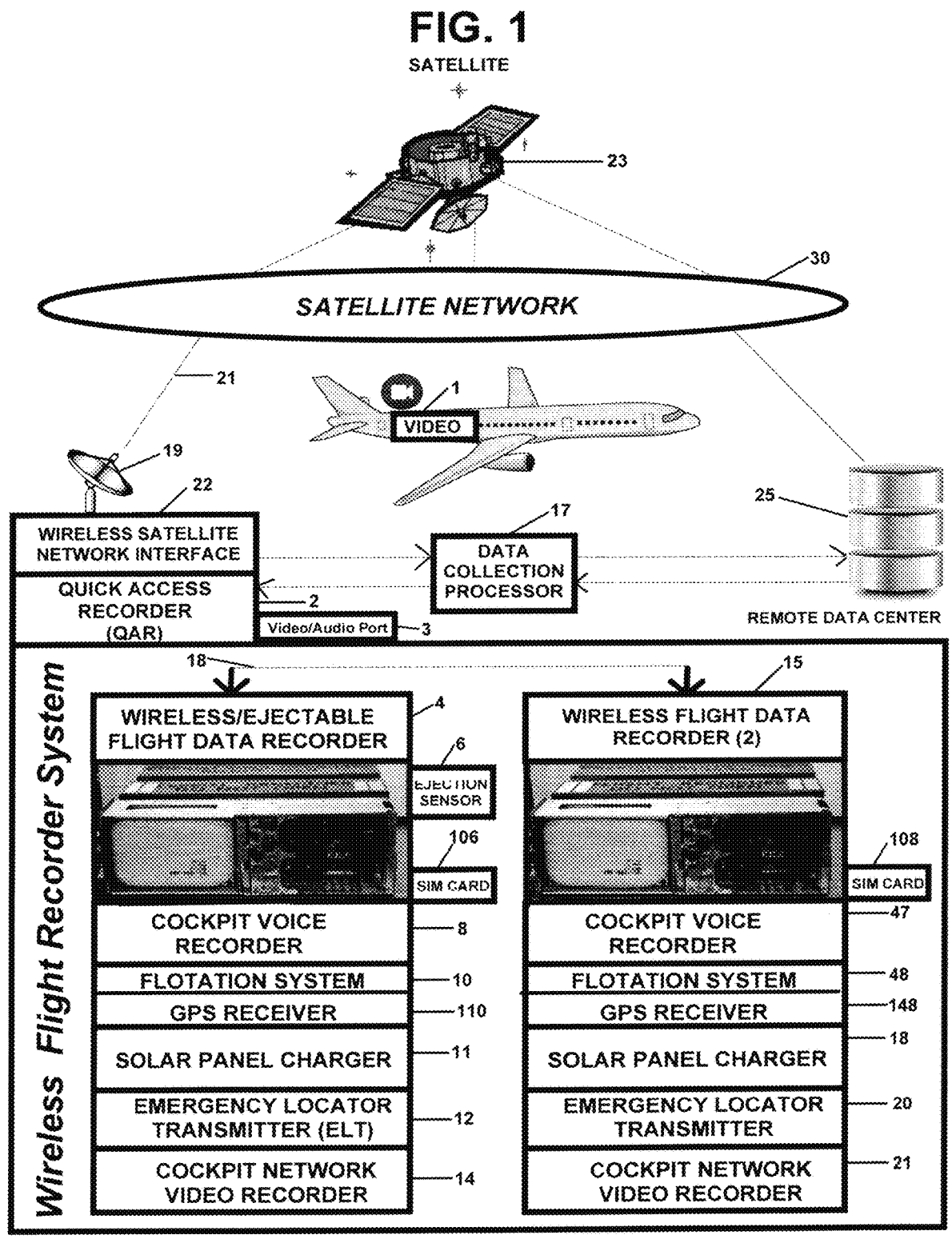
FIG. 1 is an exploded conceptual view of the wireless dual black box recorder system configuration illustrating the basic parts of the system and its intrinsic ability to connect to interstellar satellite networks for flight data collection, data redundancy and the remote data center (25) which is used to store a copy of black box data which is subsequently made available to first responders in the event of an emergency or crash.

FIG. 1 is an exploded conceptual view of the wireless black box recorder system configuration showing the most basic parts of the system and its ability to connect to interstellar satellite networks (30) for flight data collection and data transmission of black box data to remote data centers (25) which in turn stores critical flight data and which can be accessed remotely if needed.

As shown in the illustration, the system encompasses two (2) flight data records, one of which is deployable or ejectable which uses an ejection sensor (6) system to enable the device to deploy from the aircraft in the event of a crash. The systems contains both the cockpit voice recorder (8) and wireless/ejectable flight data recorder which mirrors data (17) from the aircraft fixed recorder (15). A quick access recorder (2) (QAR) houses the video port (3) for processing video data from the video system (1) used to monitor the cockpit and video images from the cabin. Most importantly, this quick access recorder also houses the wireless satellite interface (22) and antenna (19) used to obtain a broadband or high speed data connections (21) to a communications satellite network (30) to backup and write data to a remote data center (25) which saves a backup of the flight data in realtime in the event the data from the on board black boxes are lost or compromised. The data collection processor (17) is an algorithm resident to the quick access recorder to compress and encrypt the data so that the process of data transmission is faster, robost, and secured.

Figure 2:
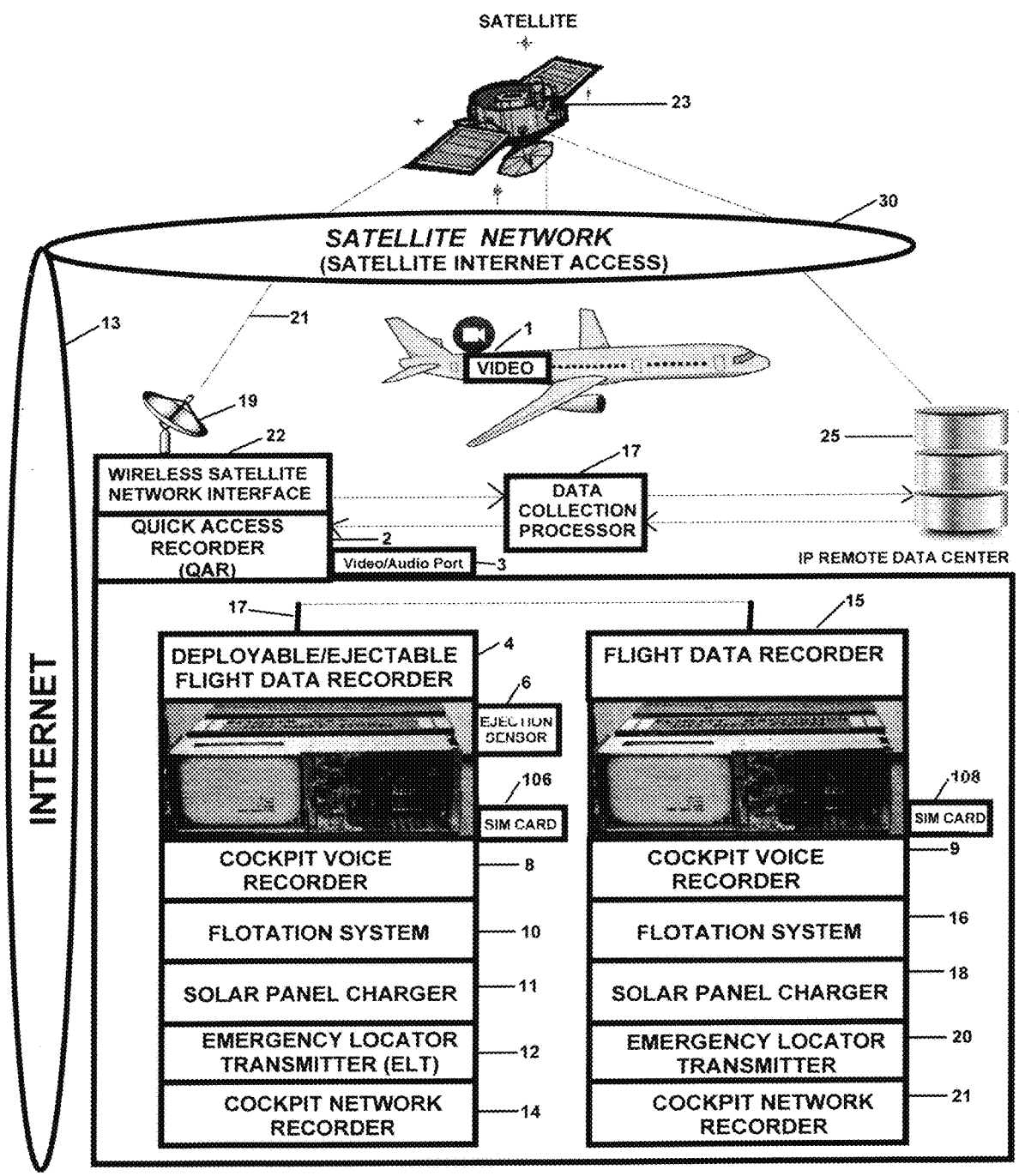
FIG. 2 is an exploded conceptual view of the invention when the internet (13) is used as a communication medium between the quick access recorder and remote data centers for keeping an "extra copy" of the black box data accessible by Internet Protocol (ip) addressing techniques.

FIG. 2 is an exploded conceptual view of the invention when the internet (13) is used as a possible communication scheme for data communication and for accessing the quick access recorder (2) and internet protocol (ip) based data centers which may located anywhere within venue of the network broadband satellite (23). Internet communication is an option of direct satellite (23) communications. as implied, the use of internet (13) protocol allows for the addressing of multiple data storage devices which may be simultaneously accessed and written to for the maintenance and protection of the flight data.

Figure 3:
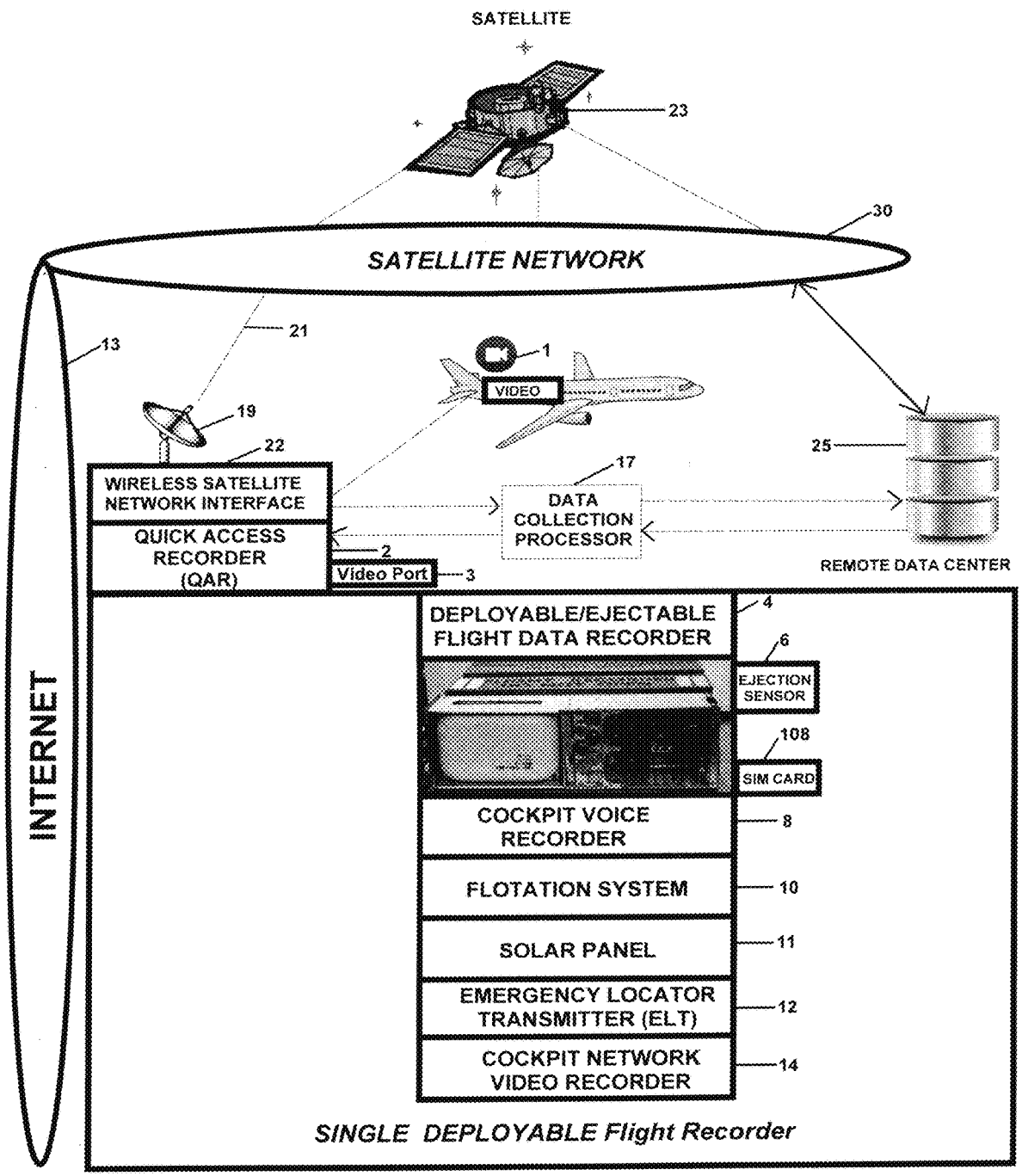
FIG. 3 is a conceptual view of the invention when only a single wireless ejectable flight data recorder is used in the configuration whereby the ejection sensor system shown in the diagram senses the pending crash and causes the flight data recorder to deploy within milliseconds prior to crash, thereby 'flying away' and reducing the shock that could potentially reach the recorder.

FIG. 3 is a conceptual view of the singular view of the invention when only one wireless/ejectable flight data recorder(4) is used in the configuration. the ejection sensor system (6) shown in the diagram senses the pending crash and causes the flight data recorder (4) to deploy from the aircraft fully equipped with the emergency locator transmitter (12) allowing investigators to locate the device immediately. The flotation system (16) allows the black box to float to surface of water if the crash occurred in water and there is a solar panel or solar materials to extend the life of the batteries of the fdr.

Figure 4:
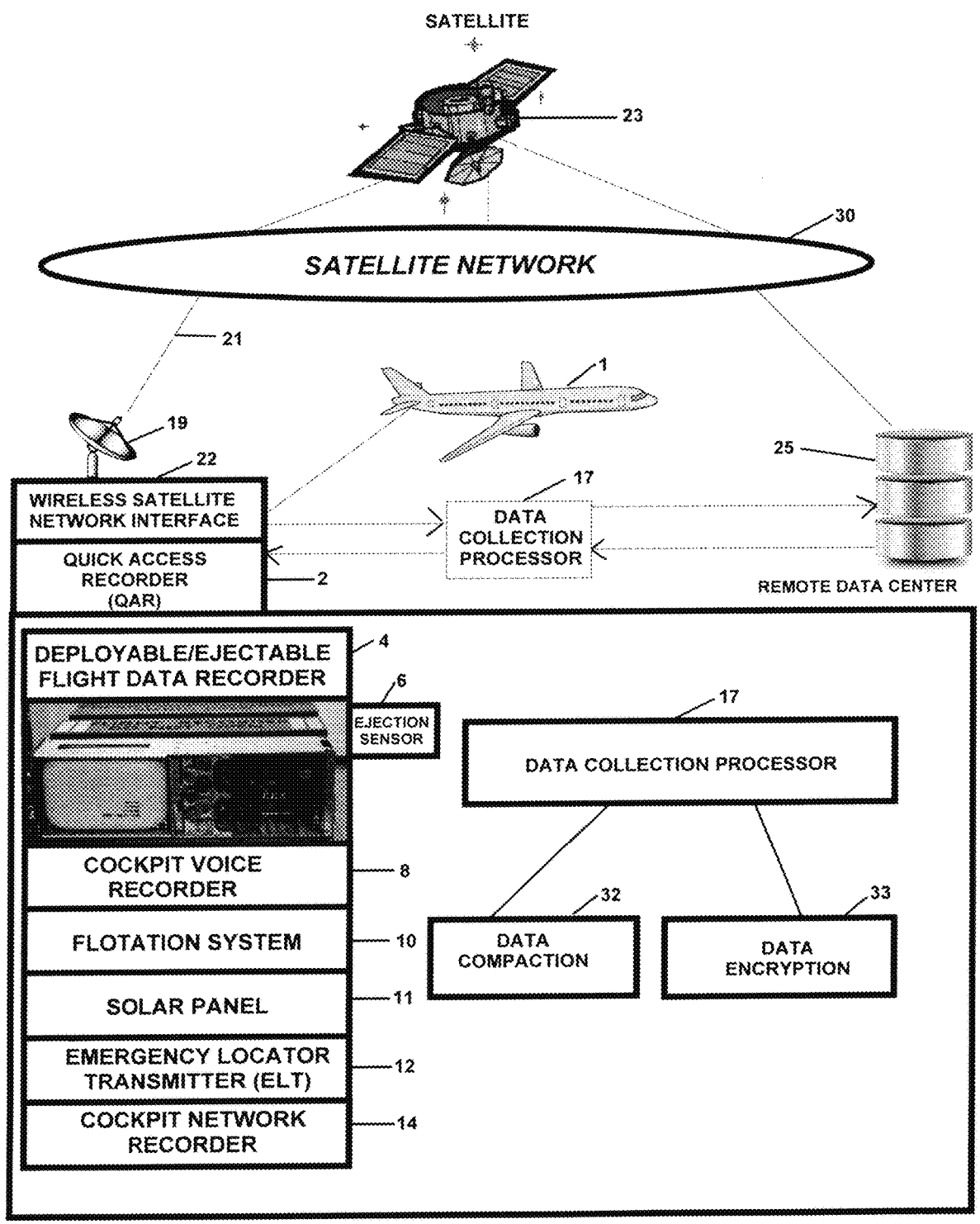
FIG. 4 is a conceptual and logical view of the data collector processor which is a software module which is responsible for streaming, data compaction for reducing bandwidth transfers to remote backup locations, and data encryption which keeps the flight data secure while in transmission to remote locations.

FIG. 4 is a conceptual and logical view of the data collection processor (17) which is a software module embedded within the quick access recorder, and which has two (2) subroutines for data compaction (32), and data encryption(33), the data compaction (32) algorithm is desirable to compact the data which passes through the system in order to use less bandwidth, and faster data transfer to remote data centers (25) the data collection processor (17) is a desirable element in the design and practice of this invention since potential large amounts of data is transmitted/received via satellite (23) or cellular communications. The data collection processor 17 is an essential element to the efficient design of the invention.

Figure 5:
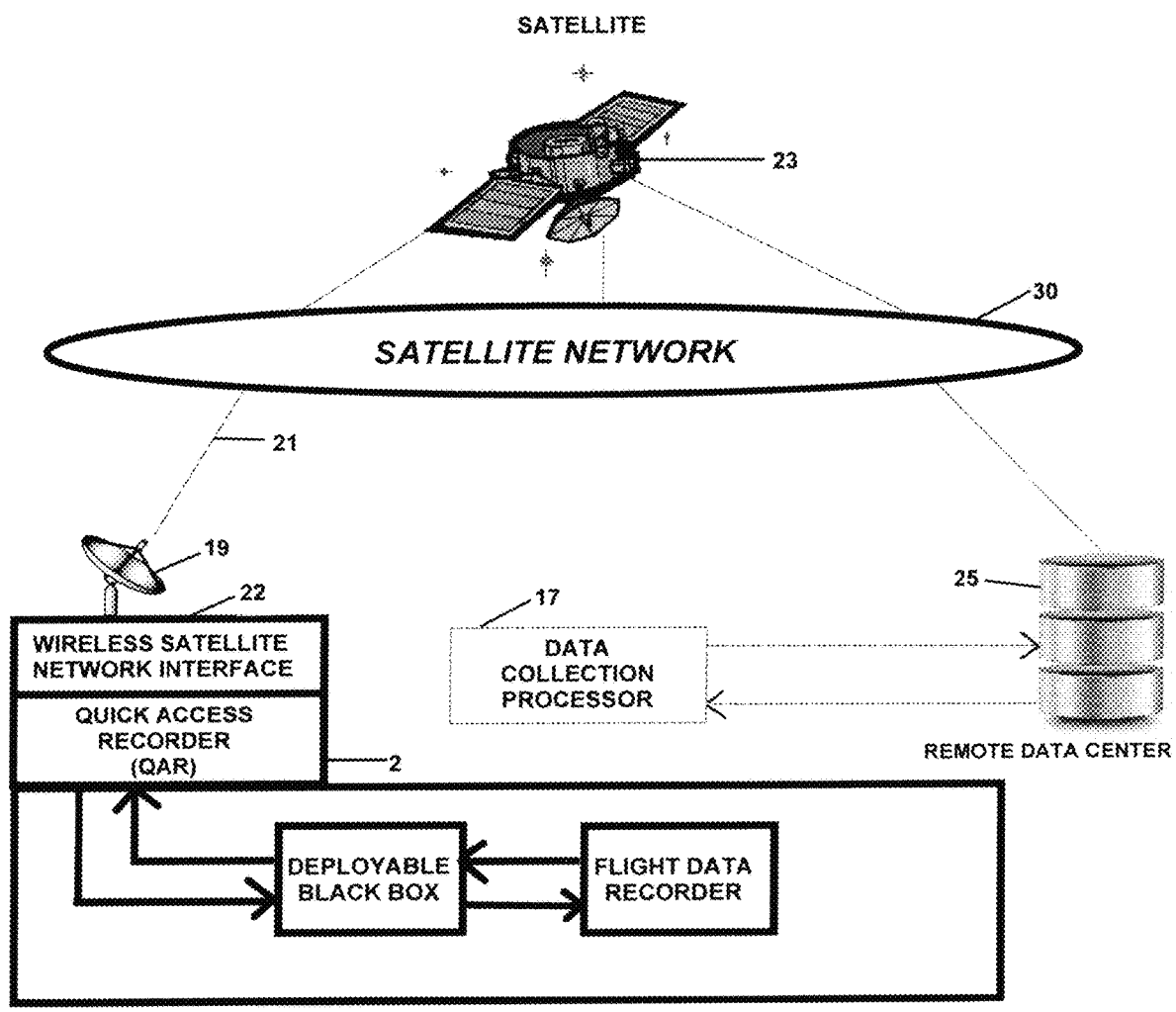
FIG. 5 is a conceptual view of a wireless satellite network interface (22) and built antenna which is used by the quick access recorder to access the satellite network for interstellar data communication between black boxes and remote data center (25)

FIG. 5 is a conceptual view of a wireless satellite network interface (22) and integrated antenna (19) which is used by the quick access recorder (2) to access the satellite network (30) for interstellar data communication between the fdr black boxes and remote data centers (25) where flight data is backup and available for real-time access As shown in this illustration, all of the data between the deployable, flight data recorder quick access recorder (2) are synchronized. As shown here, the wireless satellite network interface (30) provides the actual communications link for updates to remote data centers (25) which contain a backup copy of the flight data. All flight data captured from the satellite communications link will be processed by the data collection processor and then remotely written to the remote data center (25) or database, which can be maintained anywhere in the world or interstellar airspace within the reach of the network. This data center can be located in the ground away from the aircraft, and may be distributed in more than one physical location for even more redundancy.

Figure 6:
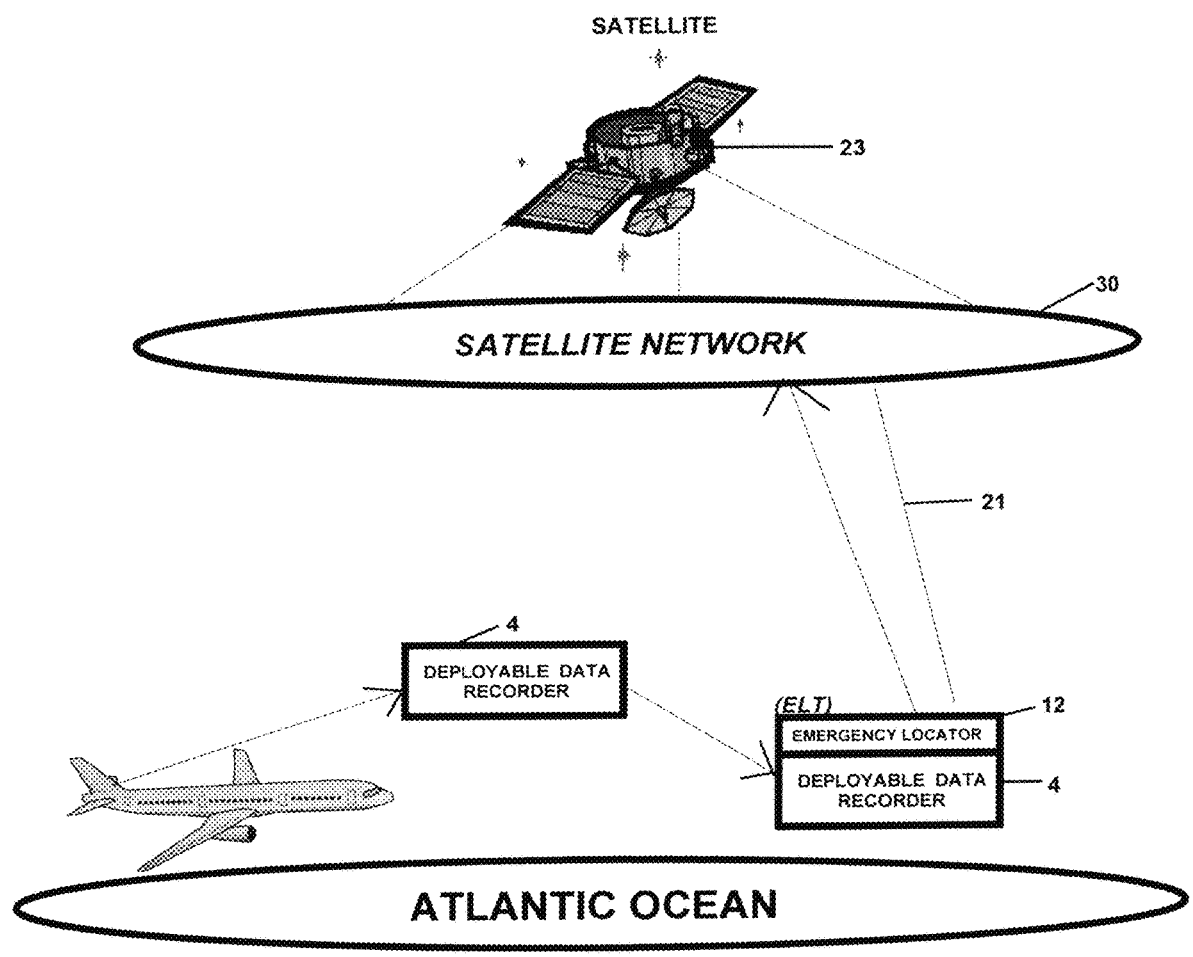
FIG. 6 is a depiction of the wireless flight recorder (4) demonstrating its ejection capabilities as it has ejected upon a crash into the Atlantic ocean, flying away from the aircraft and shock that reaches the recorders upon impact.

FIG. 6 is a conceptual view of the deployable flight recorder (4) ejecting from the aircraft when the aircraft crashes into the Atlantic ocean. the system is automatically deployed by the ejection sensors (6) which may be comprised of one or more sensors, and which signals the apparatus to eject away from the aircraft, thereby decreasing the shock from the crash. Notably is the emergency locator transmitter (12) (ELT) which transmits a beacon signal and allows the device to be located by emergency investigators.

Figure 7:
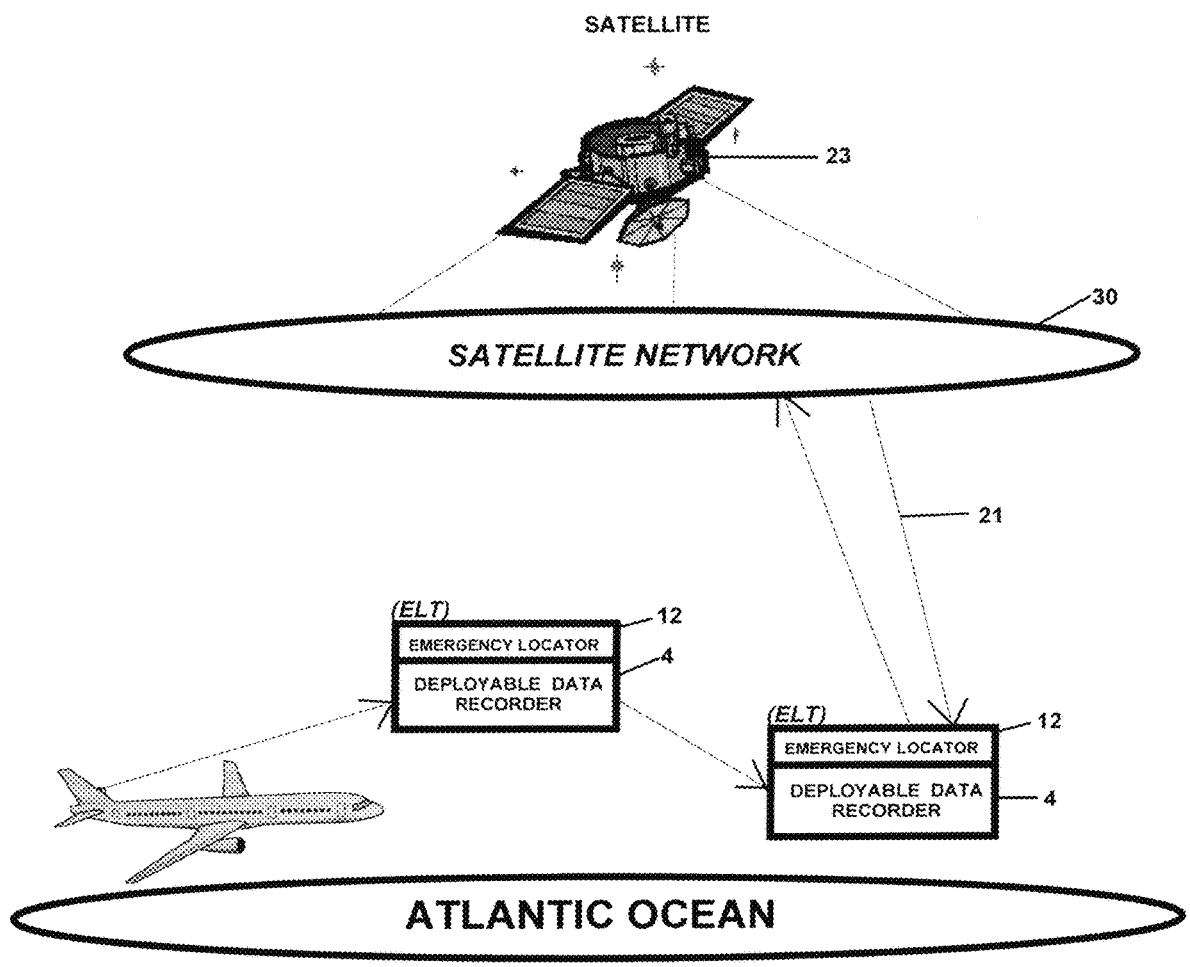
FIG. 7 is a conceptual view of the wireless flight recorder (4) demonstrating the flotation system and floating capabilities after the aircraft crash allowing the apparatus to float to the water surface for easy retrieval by emergency first responders.

FIG. 7 is a conceptual view of the deployable flight recorder (4) floating on the Atlantic ocean after the aircraft crashes. In the even of a crash, the flotation system (10) allows the deployable flight data recorder to float to the surface, which is designed to make it easer for the apparatus to be located, and save time and resources required to locate the physical black boxes.

FIG. 8 is a conceptual view of a solar powered system (11) floating on the ocean. The batteries are charged by sunlight (35) and the solar panel or other suitable solar material can be included in the design wherein this solar panel is used to extend the life of the batteries in the flight data recorder above the normal thirty (30) days and would allow the fdr systems to remain stay afloat and online for much longer periods provided the apparatus is exposed to the sun light.

Figure 9:
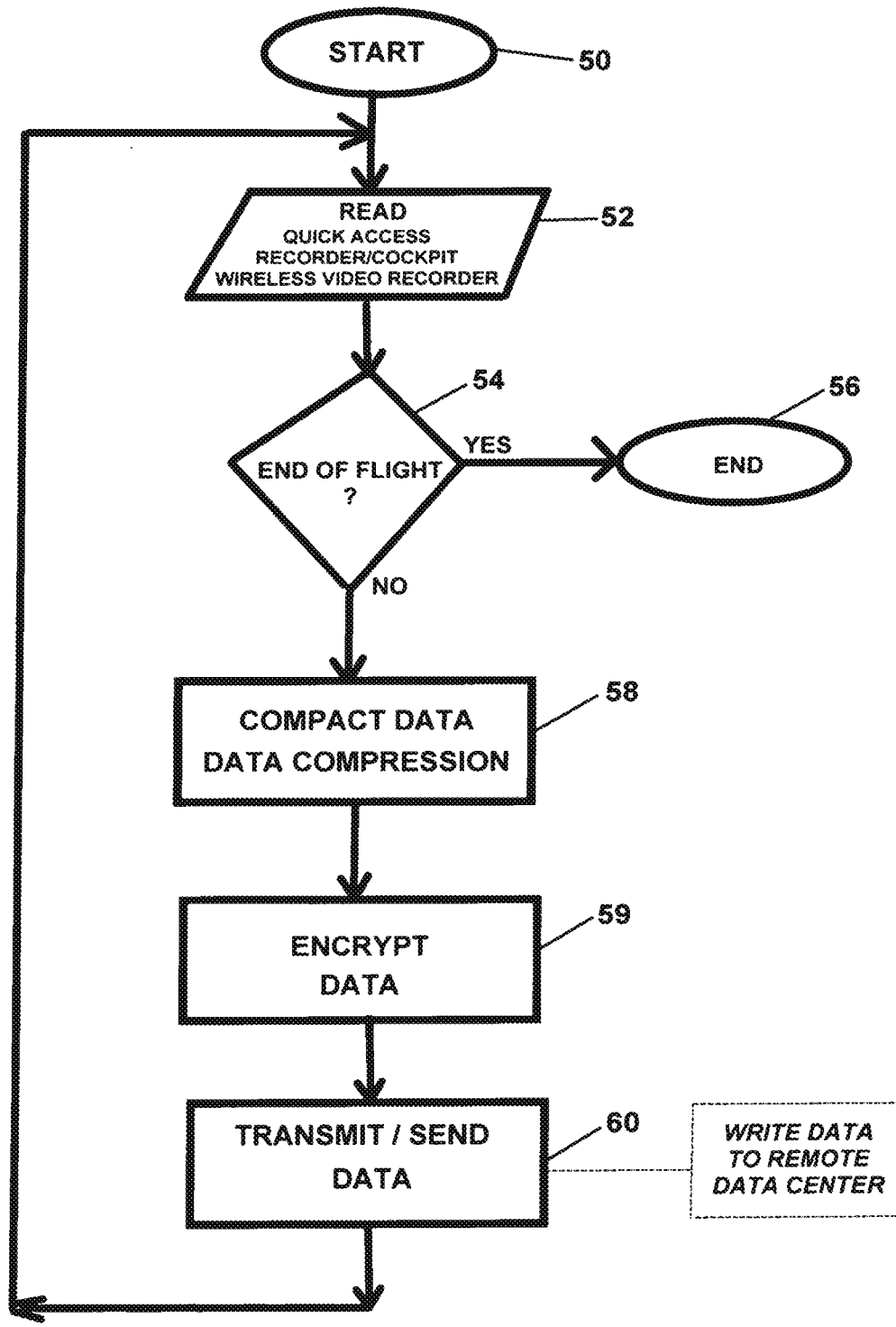
FIG. 9 is a flow chart and logical view of the logical operation of the data collection processor (17) a software processor for streaming, collecting, and encrypting data before it is transmitted over satellite links to remote data locations (25).

FIG. 9 is a flow chart and logical view of the data collection processor (17) which is shown in FIG. 1. As shown here the logical flow of the program should read the entire contents of the quick access recorder (2) compacting data and encrypting data, to be later transmitted via satellite link to the remote data location.

Figure 10:
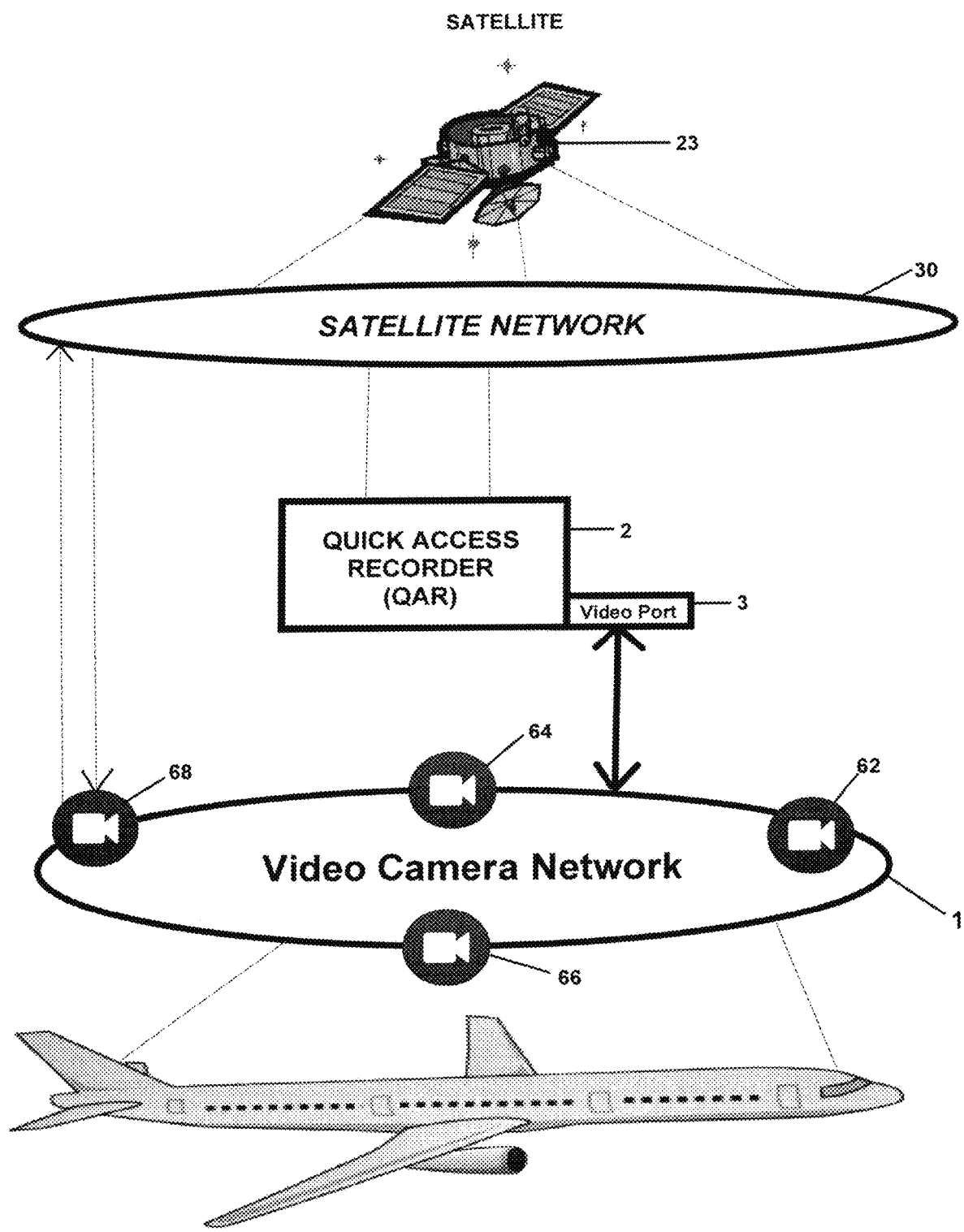
FIG. 10 is a conceptual view of the on board video camera system (1) which interfaces with the quick access recorder (2) and video port (3) used to capture video and audio data within the aircraft which may also be used as a real time video surveillance of the cockpit and passenger cabin of the aircraft.

FIG. 10 is a conceptual view of the on board video camera nework system (1) which interfaces with the quick access recorder (2) which is used to capture video and voice data on the aircraft. As shown in the illustration a networked video camera may be placed in the cockpit (62) in the midsection of the aircraft (64) and (65) and one camera in the back of the aircraft (66) which forms a local network wherein the data is sent to the black boxes and quick access recorder (2) for remote access by investigators. Video camera may also be placed on the exterior of the aircraft to capture video data occurring on the exterior of the aircraft.

Figure 11:
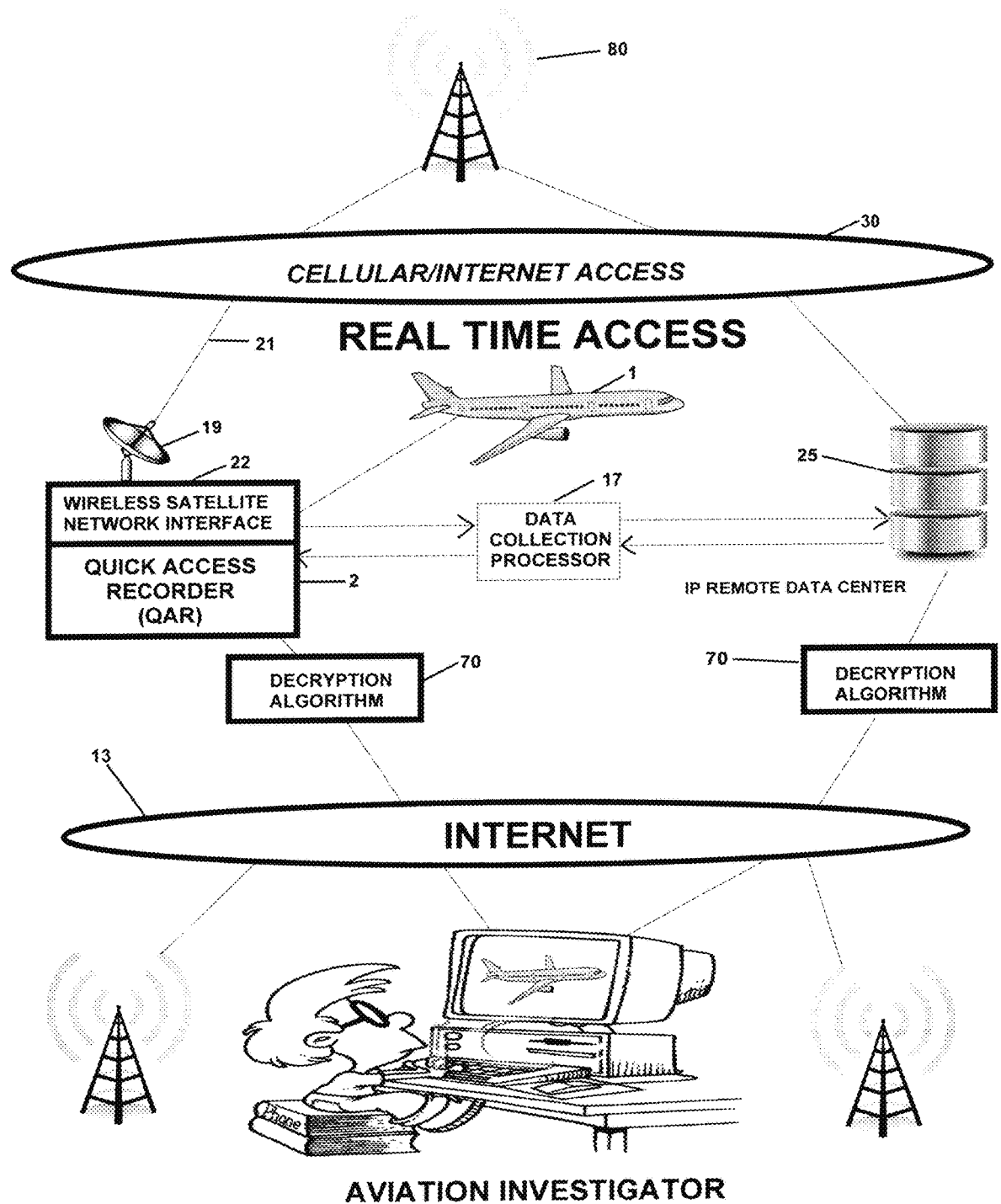
FIG. 11 depicts an aviation investigator accessing the black box data via a computer in real time via the remote data center (25) which has a duplicate copy of the black box data which may linked via cellular or satellite network.

FIG. 11 is a conceptual view of an aviation investigator access the black box in real time. as shown here the remote data center (25) where real time flight data is written to may be access via the internet via a cellular network or satellite link. In this invention, authorized personnel can also gain access the quick access recorder via satellite or cellular data link enabling investigators to obtain the information they need to perform the investigation.

Figure 12:
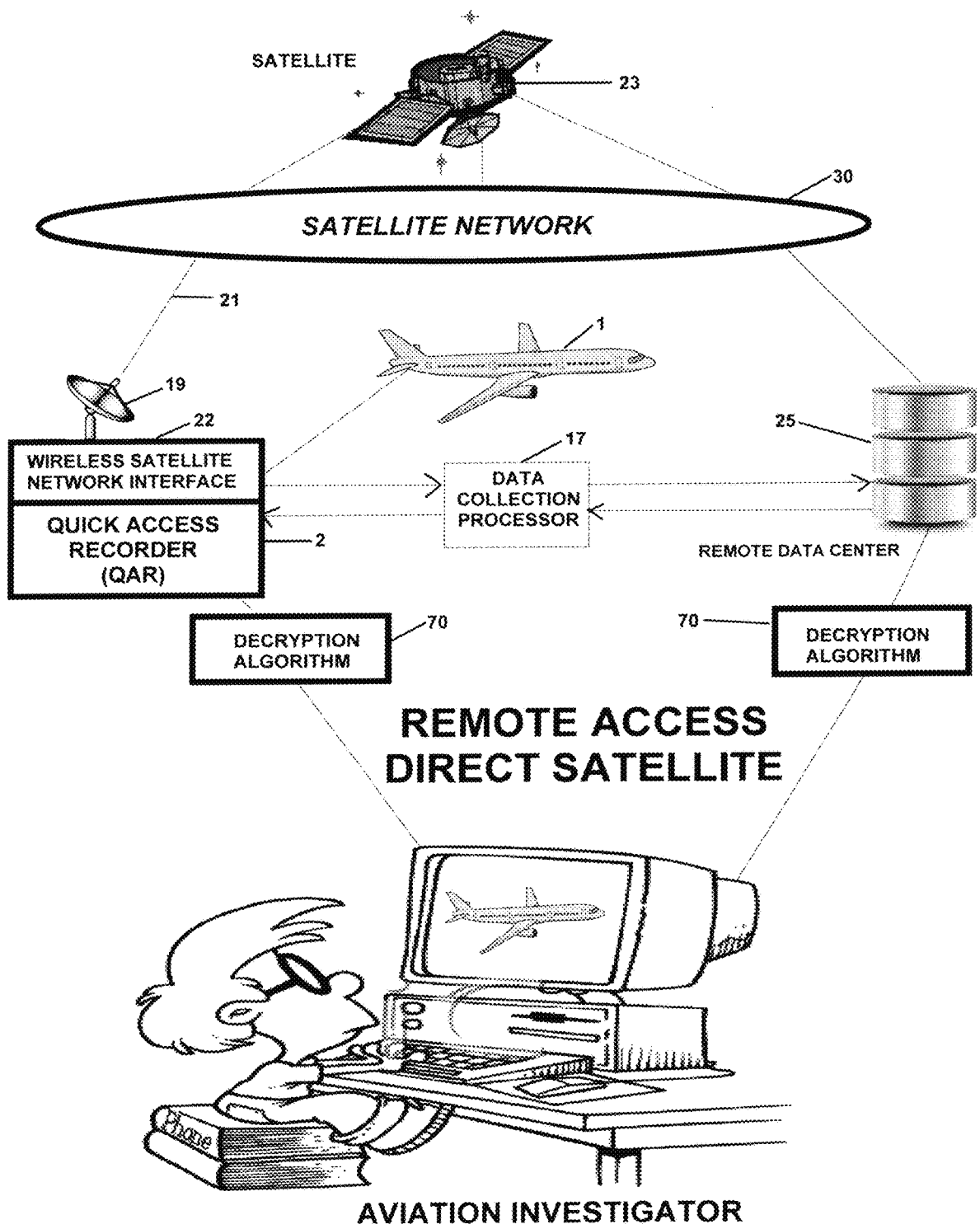
FIG. 12 depicts an aviation investigator remotely accessing the black box data in real time via direct satellite access.

FIG. 12 is a conceptual view of an aviation investigator accessing the black box system in real time via direct satellite access. As shown here the remote data center (25) where real time flight data is written to may be access directly via a satellite network (30). Important to here is the decryption algorithm (70) to decrypt the encrypted data that was stored during the write and save process. The decryption algorithm protects the flight data from be stolen by terrorist or other potential network hackers or other unauthorized persons.

Figure 13:
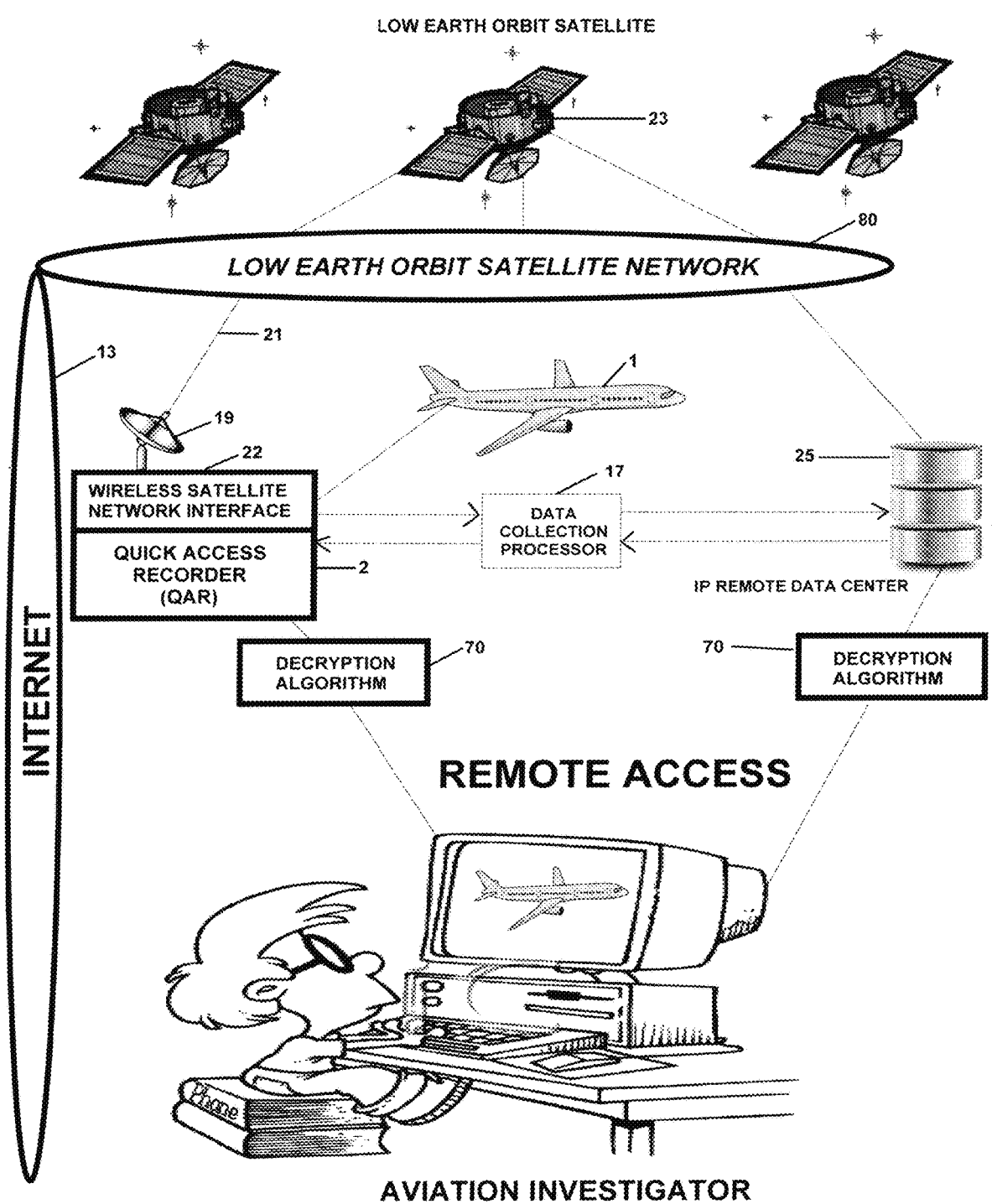
FIG. 13 is a conceptual view of an aviation investigator remotely access the quick access recorder(2) via a low earth orbit satellite network connected to the backbone of the internet (13) whereby the internet is used as the medium for communications.

FIG. 13 is a conceptual view of an end user remotely access the quick access recorder (2) via a low earth orbit satellite network (30) connected to the backbone of the internet (13) which may provide both direct remote satellite communication or satellite (23) based internet (13) connectivity to the invention and to the black box data network.

Figure 14:
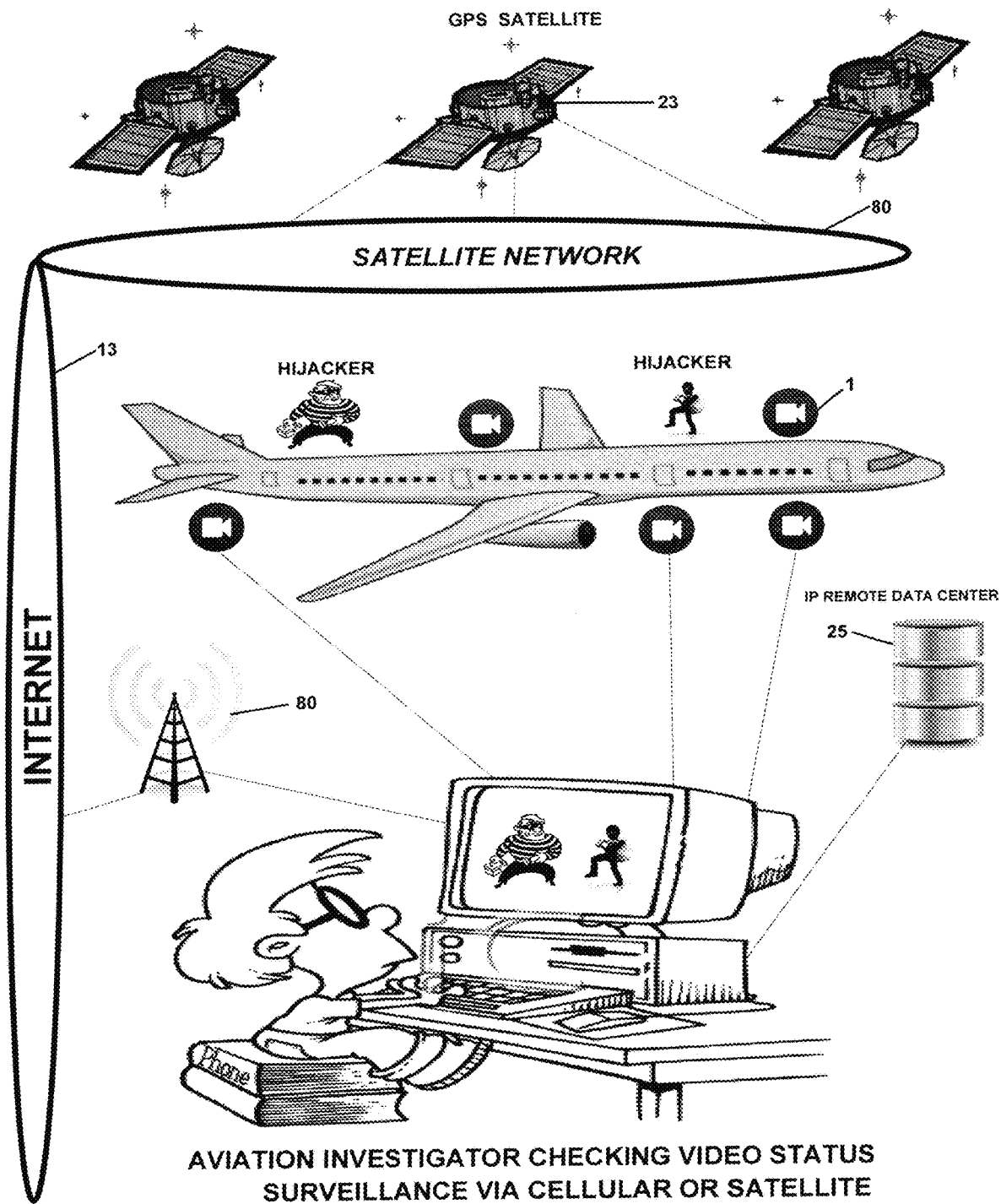
FIG. 14 is a conceptual view of a remote real time access to the on board camera system (1) which can provide emergency responders with a real-time audio and video view of the cockpit and the status of the passenger cabin.

FIG. 14 is a conceptual view of a remote real time access to the on board camera system which can provide emergency responders with a video view of the cockpit status and the status of the cabin. This video data can be included in the black box data enabling investigators to see a visual of cockpit and cabin area.

Figure 15:
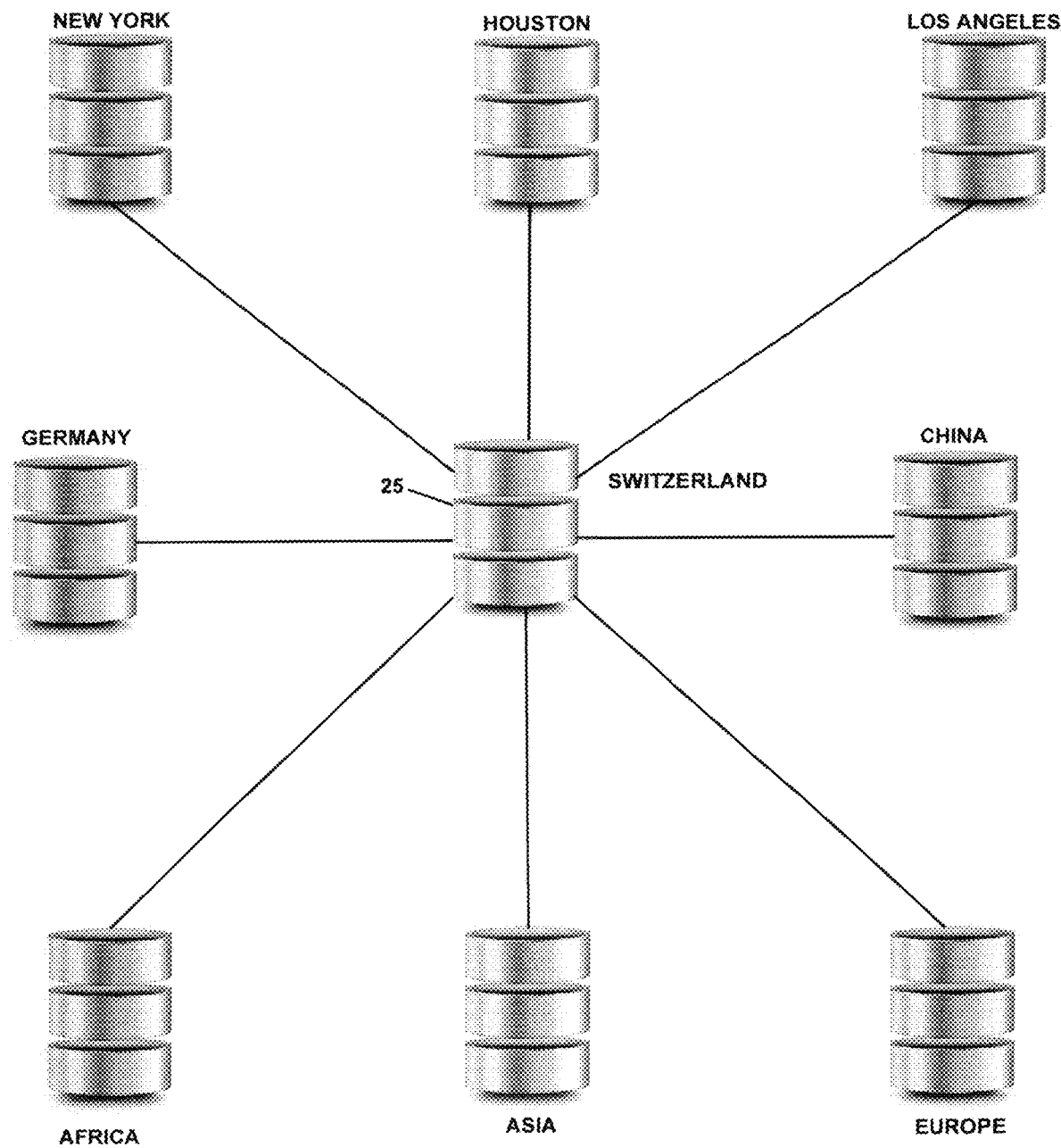
FIG. 15 is a conceptual view of an of the internet protocol (ip) based data center which comprised of a multiple inter linked data centers for data redundancy demonstrating the capability and nature of the data center used to store flight data.

FIG. 15 is a conceptual view of an of the internet (13) protocol (ip) based data center which can be comprised of a multiple based data center for storing and retrieving the black box data. The remote center keeps a copy of all black box data that was streamed to it and cannot be accessed without an decryption algorithm to decrypt the flight data.

Figure 16:
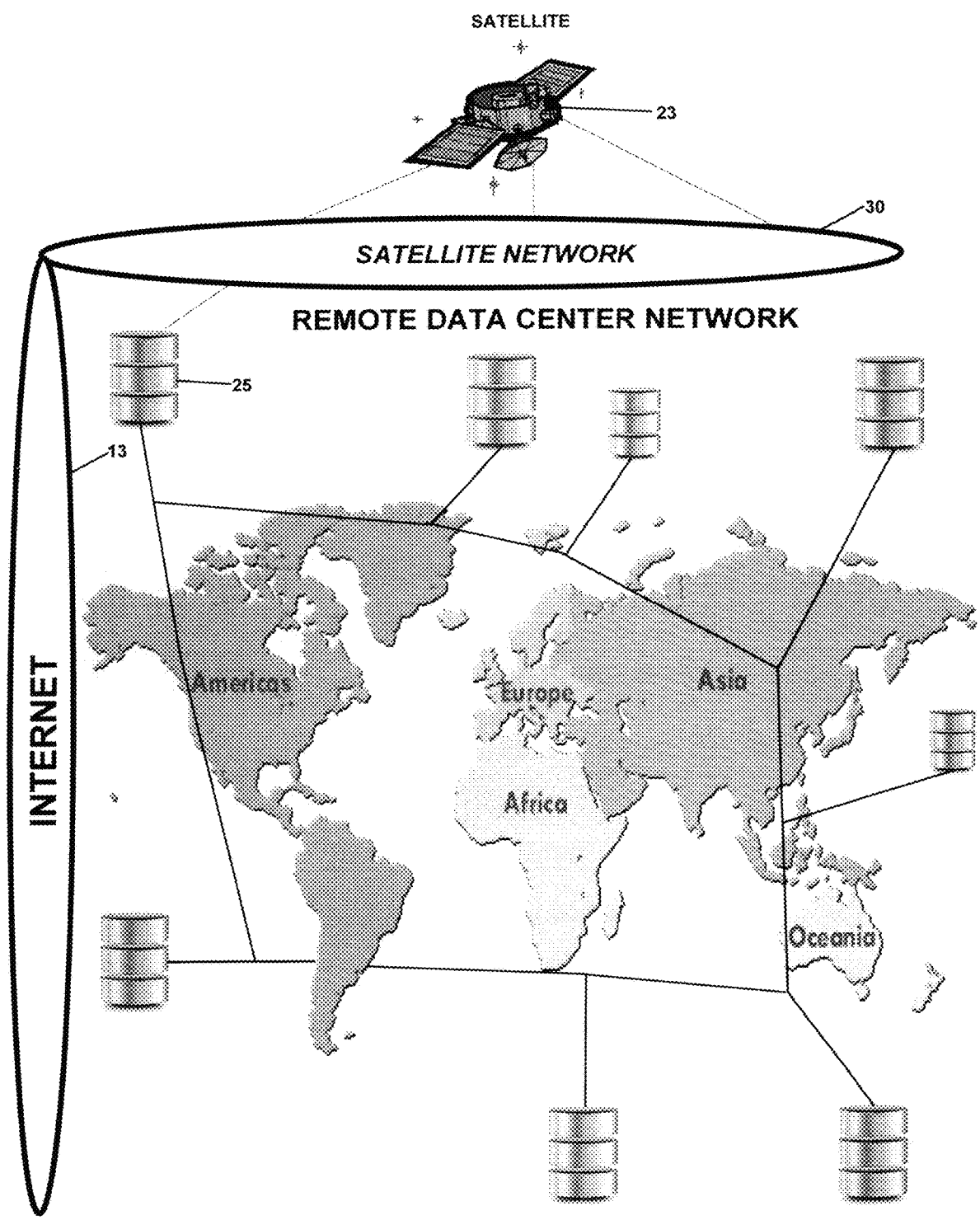
FIG. 16 is a an another view of a remote data center (25) which can be located and linked anywhere in the world via the internet (13) whereby data storage is not limited to the one data center, but may also be implemented in multiple locations.
Figure 17:
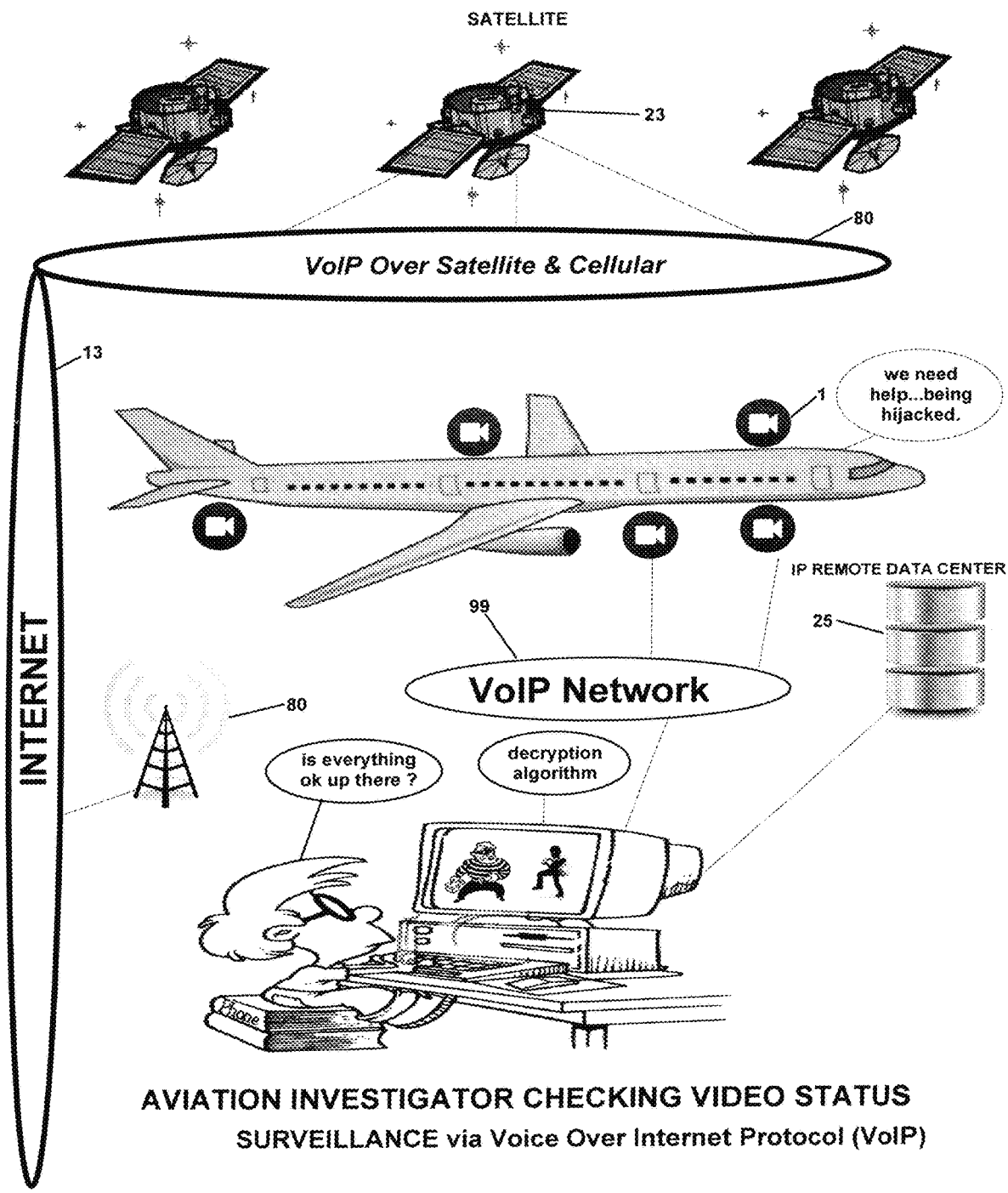
FIG. 17 is a conceptual view of a VoIP enabled network communications to the video cameras on board the aircraft whereby voice communications is enabled via a Session Initiation Protocol (SIP) scheme affords both video and audio communications via SIP end points between the camera and the initiating source.

FIG. 16 is another view of the remote data center 25 which can be located anywhere in the world and which may also be accessed via the internet using TCP/IP protocol. Data centers can also be linked by serial communications links in any serial communications protocol FIG. 17 is a conceptual view of a Voice Over Internet Protocol (VoIP) which allows both Voice and Video Communications via the Camera System. A VoIP network can be established between the internet (13) and the satellite or cellular communications system allowing the transfer of voice and video which can be very helpful to investigators who may need to know the status of the aircraft.

Figure 18:
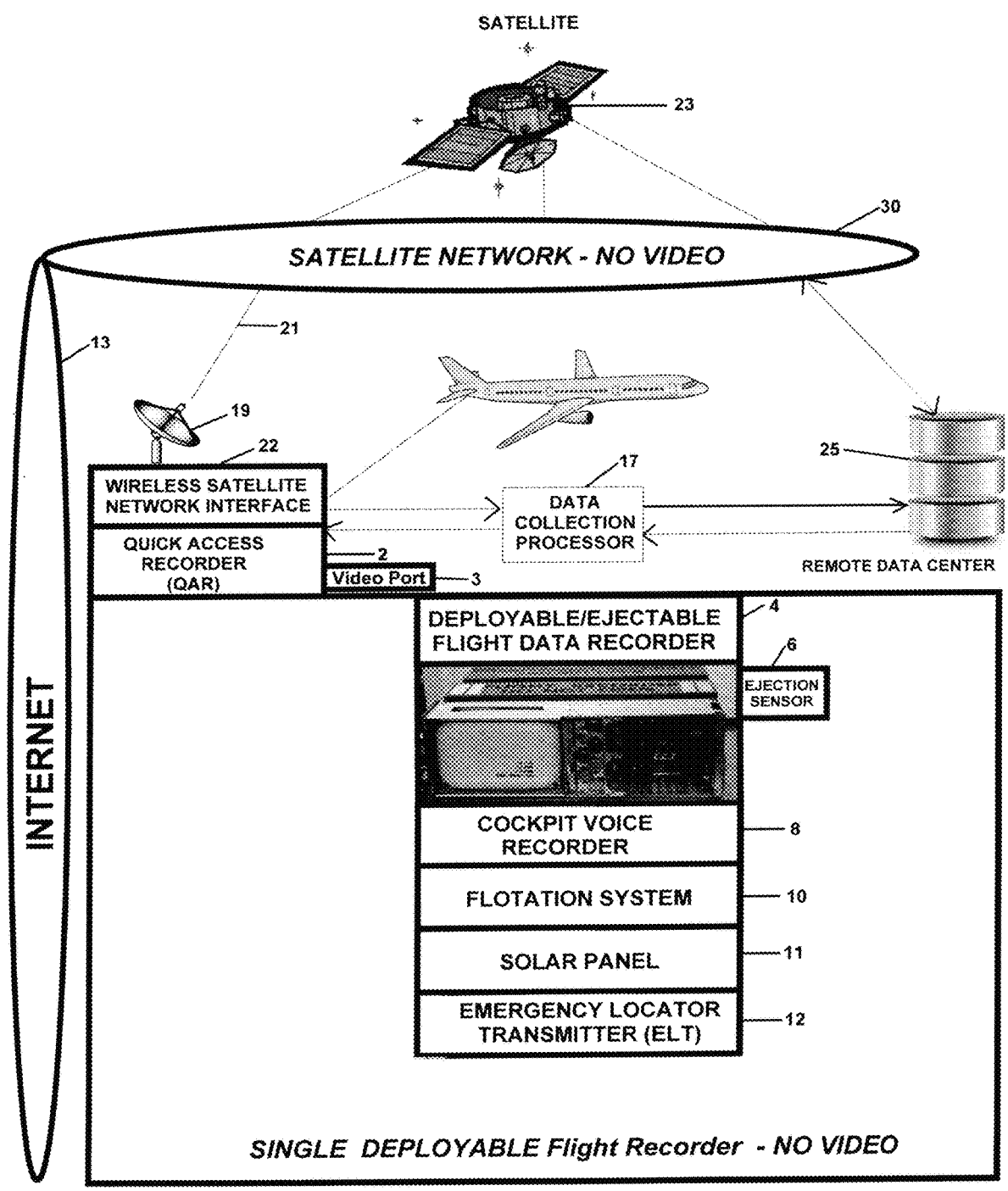
FIG. 18 is a conceptual view of the invention when no video camera system is implemented with the black box invention.
Figure 19:
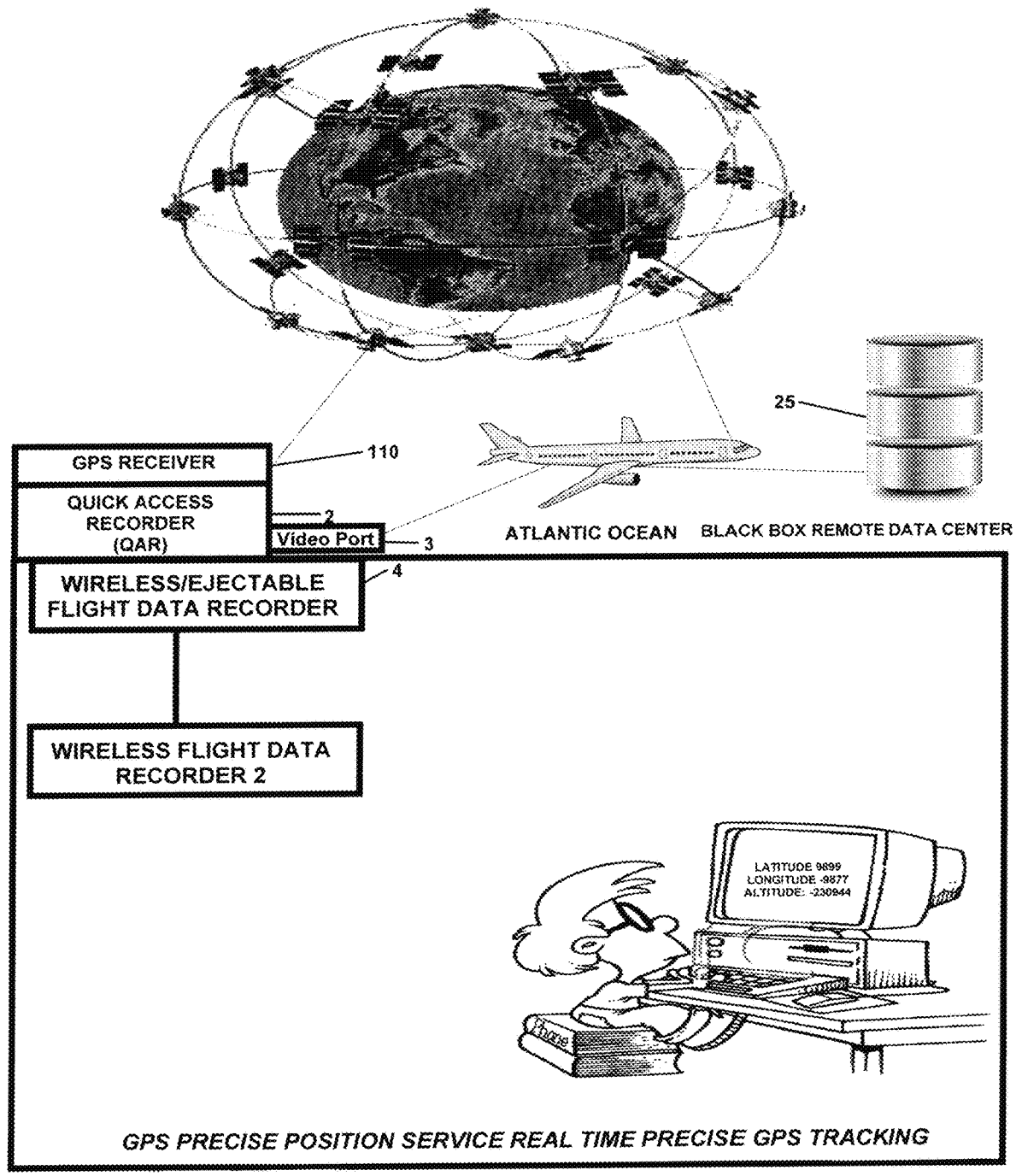
FIG. 19 is a conceptual view of the invention utilizing the NAVSTAR GPS Constellation system using the Precise Position Service wherein the (p-code) is used to calculate the precise position of a particular location.

The invention may also be deployed as a single wireless ejectable unit without video as shown in FIG. 18. In this scenario, the sole and single flight data recorder would eject upon a crash impact FIG. 19 demonstrates how the GPS receiver connects to NAVSTAR GPS PRECISE POSITION services may be used in order to track the flight and to locate the flight recorders. The "p-code" offered by this service provides the exact GPS coordinates of the flight data recorder. As shown in the diagram, authorized users or investigators can remotely access the GPS coordinates of the apparatus eliminating all possibilities of losing the apparatus.

What is claimed is:

1. A wireless GPS enabled dual flight data recorder system comprised of a flight data recorder, and a wireless ejectable flight data recorder, for an aircraft connected to a satellite network for streaming, remotely accessing, for recording critical flight data within the aircraft for remote data storage and retrieval, wherein emergency responders can remotely access said critical flight data in real time via the satellite network, embodied with a cockpit voice recorder system, a data collection processor, a quick access recorder, a wireless satellite network interface, a flotation system, a video/audio port, an on board camera network system, a cockpit network video recorder, a cockpit voice recorder, a subscriber identification module system, an emergency locator transmitter, an ejection sensor system, a remote data center, a gps enabled receiver and real time satellite network connection to a remote data center, comprising, a satellite network for streaming, accessing, and securely transferring data between said wireless GPS enabled dual flight data recorder system, wireless satellite network interface, quick access recorder, data collection processor, and the remote data center, a quick access recorder for access to storage of data on removal medium and for facilitating quick convenient access to data contained in the wireless GPS enabled dual flight data recorder system, a data collection processor utilizing real time streaming for collection of data to the wireless GPS enabled dual flight data recorder system, for data encryption, for data compaction, for data streaming, and for transmission of said critical flight data to the remote data center, a wireless satellite network interface with an antenna for facilitating a data communications link between, the wireless GPS enabled dual flight data recorder system, the satellite network, the data collection processor, and the remote data center, a wireless connection interconnecting the flight data recorder and the wireless ejectable flight data recorder, for synchronization of data stored within said wireless GPS enabled dual flight data recorder system, a solar panel charging system constructed to the wireless ejectable flight data recorder wherein said solar panel charging system provides a means to extend the battery life of the wireless electable flight data recorder, an ejection sensor system to trigger the wireless ejectable, flight data recorder to eject from the aircraft, said remote data center configured to decrypt encrypted data stored in the remote data center allowing emergency responders to remotely access critical flight data via satellite network and to remotely monitor said onboard camera network system, the flight data contained in the remote data center and, a military grade gps satellite system, for establishing precise gps coordinates for computing the precise location of the wireless ejectable flight data recorder.

2. A wireless dual flight data recorder system embodied with a flight data recorder, a wireless ejectable flight data recorder, a remote data center, and a satellite network for streaming critical flight data, data redundancy, and further embodying a wireless satellite network interface, a quick access recorder, a gps system, a real time video surveillance system, for remote backup duplication of critical flight data, and real-time monitoring with access to of said critical flight data within the flight data recorder system of an aircraft, comprising;

means for recording critical flight data and cockpit voice recordings within the cockpit and passenger cabin of the aircraft;

means for ejection of the wireless ejectable flight data recorder to automatically eject from the aircraft utilizing an ejection sensor;

means for recording voice communications within the cockpit of the aircraft, utilizing a cockpit voice recorder;

means for floating the wireless ejectable flight data recorder on water utilizing viable-constructed flotation materials;

means for providing satellite communications connectivity between the quick access recorder, the wireless satellite network interface, and the remote data center;

means for providing a data collection processor for collection of data contained within the wireless dual flight data recorder system wherein a wireless satellite data link is established to remotely backup, and store critical flight data to the remote data center;

means for providing quick access to raw fight data within the wireless dual flight data recorder system via the quick access recorder utilizing a usb port, a subscriber identity module, and cellular network;

means for providing quick access to raw fight data contained within the wireless dual flight data recorder system via the quick access-recorder, the wireless satellite network interface, and the satellite network allowing direct real time access to the wireless dual flight data recorder system and critical flight data stored therein;

means for interstellar communications between the wireless ejectable flight data recorder, the quick access recorder, and the remote data center;

means for remote data storage, storing and duplication of said critical flight data by transmitting said critical flight data to the remote data center;

means for establishing data communications between a real time video surveillance system, and a video camera system, for initiating real time video surveillance and voice communications within the cockpit and passenger cabin of the aircraft;

means for capturing video and audio data within the cockpit and passenger cabin of the aircraft utilizing a cockpit network video recorder;

means for providing data compaction and data encryption for streaming flight data between the quick access recorder the satellite network, and the remote data center utilizing the data collection processor;

means for remote mass storage of data within the remote data center to be utilized for storing critical flight data:

means for providing tracking transmitters and with robust tracking signals for locating the flight data recorder, and the wireless ejectable flight data recorder;

means for establishing wireless data communications between the wireless ejectable dual flight data recorder and the flight data recorder for instant synchronization of data within the wireless dual flight data recorder system;

means for providing solar power to a battery of the flight data recorder, and a battery of the wireless ejectable flight data recorder, utilizing solar panels for extending the life of the battery of the said flight data recorder, and the battery of the wireless ejectable flight data recorder;

means for compacting said critical flight data residing in the memory of the wireless dual flight data recorder system for compacting the critical flight data;

means for high speed transmission of compacted critical flight data, wherein, the compacted critical flight data will be wirelessly transmitted to the remote data center;

means for encrypting the critical flight data contained within the wireless dual flight data recorder system and the remote data center for protecting the integrity, the confidentiality, and the safety of the critical flight data;

means for providing a direct real-time camera visual of the cockpit and passenger cabin of an aircraft for recording video and audio wherein an onboard camera system and camera network is utilized for real-time surveillance within the aircraft;

means for decrypting said critical data to allow emergency responders to securely retrieve, and securely access critical flight data stored within the remote data center and the wireless dual flight data recorder system;

means for decrypting said critical flight data and secured access to encrypted flight data stored within the remote data center;

means for providing data communications to the wireless dual flight data recorder system and the remote data center via a cellular network;

means for providing real time streaming between the wireless dual flight data recorder system and the remote data center.

3. The wireless dual flight data recorder system embodied with a flight data recorder, a wireless ejectable flight data recorder and remote data center, and satellite network for streaming remote backup in accordance with claim 2, wherein recording flight data from the aircraft comprises a cockpit voice recorder cockpit network video recorder and a data collection processor.

4. The wireless dual flight data recorder system embodied with a flight data recorder, a wireless ejectable flight data recorder and remote data center, and satellite network for streaming remote backup in accordance with claim 2, wherein the flight data recorder can automatically eject from an aircraft comprises a system of ejection sensors.

5. The wireless dual flight data recorder system embodied with a flight data recorder, a wireless ejectable flight data recorder and remote data center, and satellite network for streaming remote backup in accordance with claim 2, wherein recording communications within the cockpit and passenger cabin of an aircraft comprises a cockpit voice recorder, cockpit video recorder and a camera network system.

6. The wireless dual flight data recorder embodied with a flight data recorder, a wireless electable flight data recorder and remote data center, and satellite network for streaming remote backup in accordance with claim 2, wherein the flight data recorder will float in the event of a crash in water.

7. The wireless dual flight data recorder system embodied with a flight data recorder, a wireless ejectable flight data recorder and remote data center, and satellite network for streaming remote backup in accordance with claim 2, wherein satellite communications connectivity connects a quick access recorder to the remote data center.

8. The wireless dual flight data recorder system embodied with a flight data recorder, a wireless ejectable flight data recorder and remote data center, and satellite network for streaming remote backup in accordance with claim 2, wherein access to raw flight data from the wireless dual flight data recorder system is through usb port, cellular network, and satellite network.

9. The wireless dual flight data recorder system embodied with a flight data recorder, a wireless ejectable flight data recorder and remote data center, and satellite network for streaming remote backup in accordance with claim 2, wherein said means for transmitting data between the quick access recorder, the satellite network, and the remote data center comprises an antenna, and a data collection processor.

10. The wireless dual flight data recorder embodied with a flight data recorder, a wireless ejectable flight data recorder and remote data center, and satellite network for streaming remote backup in accordance with claim 2, wherein an interstellar telecommunications network is used to control data communications between the quick access recorder and the remote data center.

11. The wireless dual flight data recorder system embodied with a flight data-recorder, a wireless ejectable flight data recorder and remote data center, and satellite network for streaming remote backup in accordance with claim 2, wherein said means for establishing data communication between the a video camera system, a quick access recorder and comprises a video port and a data collection processor for collection of video data.

12. The wireless dual flight data recorder system embodied with a flight data recorder, a wireless electable flight data recorder and remote data center, and satellite network for streaming remote backup in accordance with claim 2, wherein the recording of video and audio of the cockpit and cabin of an aircraft, utilizing a video camera network system, for the collection of video and audio from the cockpit and passenger cabin of the aircraft.

13. The wireless dual flight data recorder system embodied with a flight data recorder, a wireless ejectable flight data recorder and remote data center, and satellite network for streaming remote backup in accordance with claim 2; wherein data compaction, data encryption, comprises a data collection processor which deploy subroutines that will encrypt data, compress data, and stream data from the wireless dual flight data recorder system to the remote data center.

14. The wireless dual flight data recorder system embodied with a flight data recorder, a wireless ejectable flight data recorder and remote data center, and satellite network for streaming remote backup in accordance with claim 2, wherein remote mass storage of the flight data recorder system comprises multiple data centers which are interconnected for redundancy of flight data collected from the wireless dual flight data recorder system.

15. The wireless dual flight data recorder system embodied with a flight data recorder, a wireless ejectable flight data recorder and remote data center, and with satellite network for streaming remote backup in accordance with claim 2, wherein tracking transmitters operating in unison for transmitting distress radio beacon is used to assist emergency responders to locate the wireless ejectable dual flight data recorder system and survivors.

16. The wireless dual flight data recorder system embodied with a flight data recorder, a wireless ejectable flight data recorder and remote data center, and satellite network for streaming remote backup in accordance with claim 2, wherein a communications data channel is established between the flight data recorder, the wireless ejectable flight data recorder, and the flight data recorder for maintaining data synchronization within the wireless dual flight data recorders system.

* * * * *